United States Patent
Iwaki

(10) Patent No.: US 7,092,122 B2
(45) Date of Patent: Aug. 15, 2006

(54) IMAGE PROCESSING DEVICE AND METHOD

(75) Inventor: Yasuharu Iwaki, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 917 days.

(21) Appl. No.: 09/906,669

(22) Filed: Jul. 18, 2001

(65) Prior Publication Data
US 2002/0080379 A1    Jun. 27, 2002

(30) Foreign Application Priority Data
Jul. 18, 2000   (JP)   ............................. 2000-217031
Jul. 31, 2000   (JP)   ............................. 2000-232128

(51) Int. Cl.
*G06F 15/00*   (2006.01)
*G03F 3/08*   (2006.01)
*G06K 9/00*   (2006.01)

(52) U.S. Cl. .................... 358/1.9; 358/520; 382/167
(58) Field of Classification Search ................. 358/1.9, 358/520, 521, 518, 538; 382/167, 162; 348/256, 348/603, 645, 703
See application file for complete search history.

(56) References Cited

U.S. PATENT DOCUMENTS

| | | | | |
|---|---|---|---|---|
| 4,745,467 A | * | 5/1988 | Sekizawa et al. ........... | 358/523 |
| 5,181,105 A | * | 1/1993 | Udagawa et al. ........... | 358/520 |
| 5,384,601 A | * | 1/1995 | Yamashita et al. .......... | 348/577 |
| 5,657,758 A | * | 8/1997 | Posse et al. ................. | 600/413 |
| 5,940,530 A | * | 8/1999 | Fukushima et al. ......... | 382/164 |
| 5,966,222 A | * | 10/1999 | Hirata et al. ................ | 358/520 |
| 6,088,137 A | * | 7/2000 | Tomizawa ................... | 358/538 |
| 6,160,912 A | * | 12/2000 | Usami ........................ | 382/167 |
| 6,163,321 A | * | 12/2000 | Kiyokawa ................... | 345/589 |
| 6,272,239 B1 | * | 8/2001 | Colla et al. ................. | 382/167 |
| 6,292,574 B1 | * | 9/2001 | Schildkraut et al. ........ | 382/117 |
| 6,445,816 B1 | * | 9/2002 | Pettigrew ................... | 382/162 |
| 6,466,186 B1 | * | 10/2002 | Shimizu et al. ............. | 345/60 |
| 6,476,877 B1 | * | 11/2002 | Kihara et al. ............... | 348/650 |
| 6,603,878 B1 | * | 8/2003 | Takemoto .................... | 382/167 |
| 6,631,206 B1 | * | 10/2003 | Cheng et al. ............... | 382/164 |
| 6,697,537 B1 | * | 2/2004 | Norimatsu .................... | 382/275 |
| 6,711,286 B1 | * | 3/2004 | Chen et al. .................. | 382/162 |
| 6,791,716 B1 | * | 9/2004 | Buhr et al. ................... | 358/1.9 |
| 6,813,043 B1 | * | 11/2004 | Mizuyama et al. ......... | 358/3.03 |
| 6,850,342 B1 | * | 2/2005 | Woolfe et al. ............... | 358/1.9 |

(Continued)

FOREIGN PATENT DOCUMENTS

JP   5-328132   12/1993

(Continued)

*Primary Examiner*—Madeleine A V Nguyen
(74) *Attorney, Agent, or Firm*—Birch, Stewart, Kolasch, and Birch, LLP

(57) ABSTRACT

In order to achieve to adjust saturation of an image without leading to a deterioration in image quality, there is provided an image processing device and method in which a conversion data has a conversion characteristic which suppresses a change in saturation in a visible image for pixels belonging to a predetermined color region, and in order to achieve that changes in image quality which accompany conversion of gradation of an image data can be accurately corrected, there is provided an image processing device and method in which one of reconverting the image data which is converted or controlling a conversion characteristic is performed, such that changes in a ratio of a difference, of each of color components, with respect to gray of each pixel of the image data, which changes accompany conversion of the gradation of the image data, are corrected.

13 Claims, 13 Drawing Sheets

U.S. PATENT DOCUMENTS 6,868,179 B1* 3/2005 Gruzdev et al. ............ 382/167
2001/0016054 A1* 8/2001 Tsuruoka et al. ........... 382/167
2002/0005965 A1* 1/2002 Nagae et al. ............... 348/650

FOREIGN PATENT DOCUMENTS

JP  6-124329  5/1994

* cited by examiner

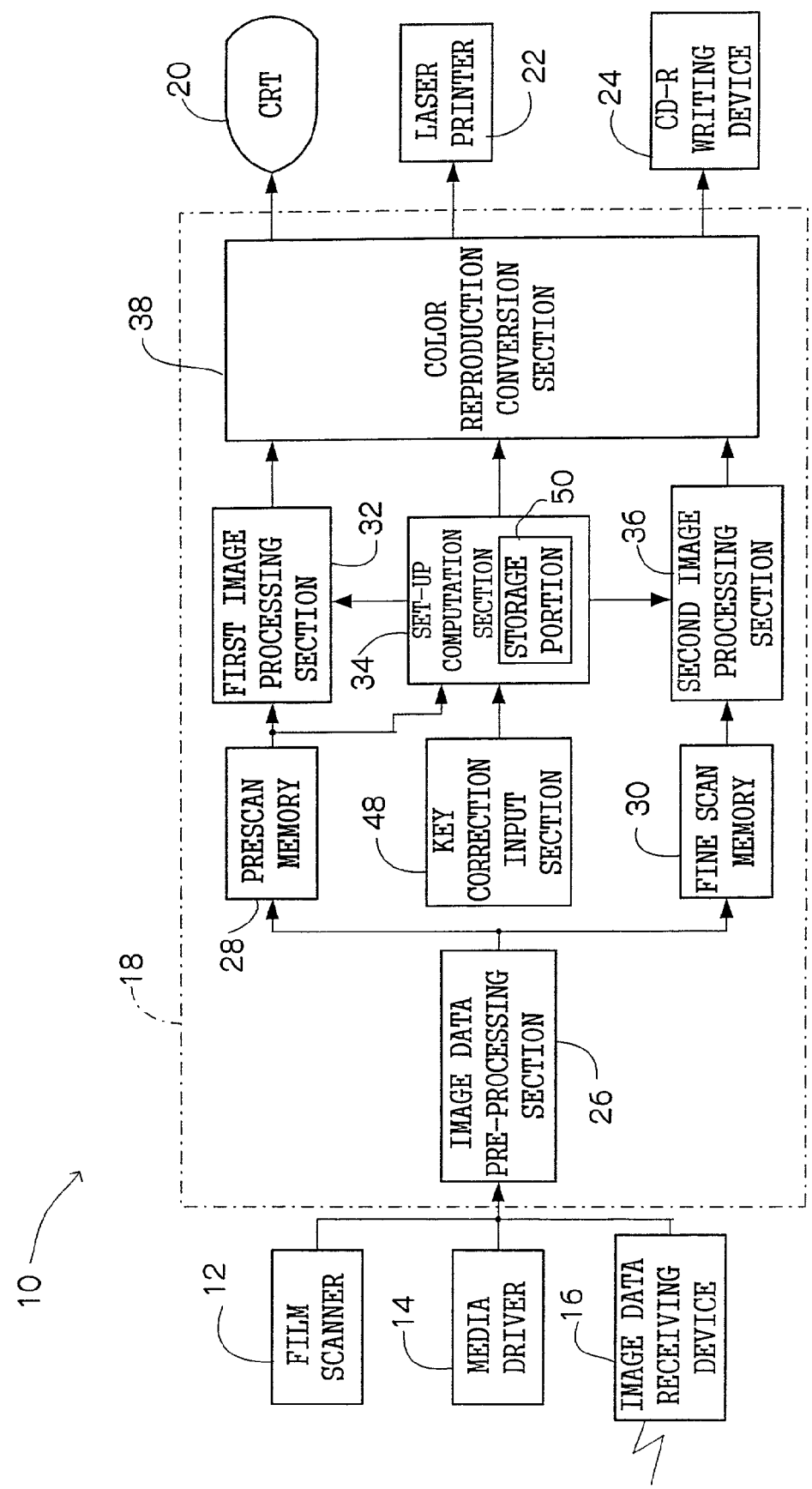

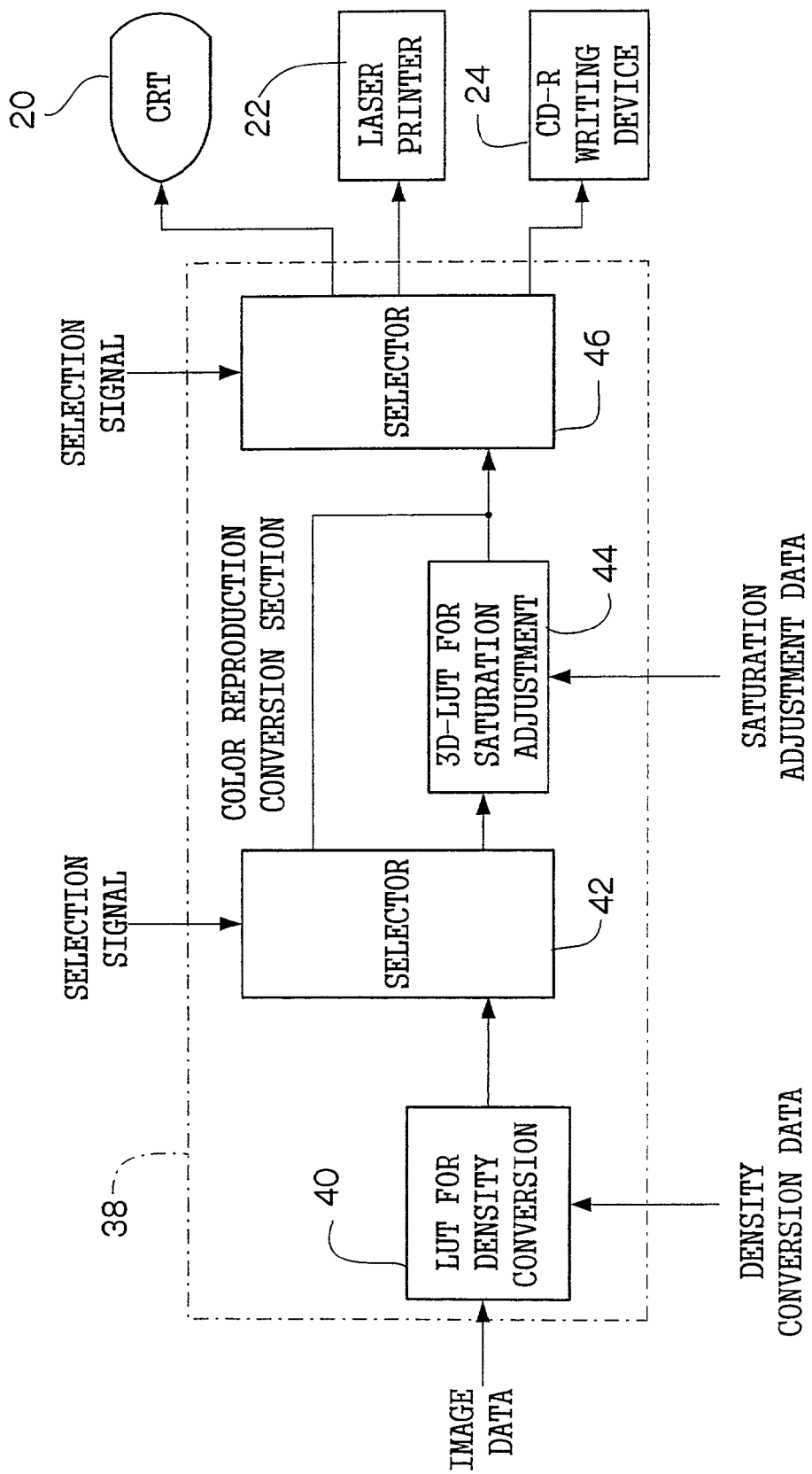

<EXAMPLE OF COLOR REPRODUCTION REGION IN OUTPUT IMAGE>

※ NOTE THAT THE NUMERICAL VALUES IN THE FIGURE ARE VALUES IN A CASE IN WHICH THE R, G, B DENSITIES ARE EXPRESSED BY 8-BIT DATA

FIG. 10

| GRADATION CONVERSION CONDITION CORRECTION SCREEN | |
|---|---|
| HIGHLIGHT REGION $\gamma$ | HARD GRADATION ENHANCEMENT / NO CORRECTION / SOFT GRADATION ENHANCEMENT |
| INTERMEDIATE REGION $\gamma$ | HARD GRADATION ENHANCEMENT / NO CORRECTION / SOFT GRADATION ENHANCEMENT |
| SHADOW REGION $\gamma$ | HARD GRADATION ENHANCEMENT / NO CORRECTION / SOFT GRADATION ENHANCEMENT |

IMAGE PROCESSING DEVICE AND METHOD

BACKGROUND OF THE INVENTION

1. Field of the Invention

The present invention relates to an image processing device and method, and in particular, to an image processing device which converts image data such that saturation of an image is changed, and to an image processing method which can be applied to the image processing device. Further, the present invention relates to an image processing method which can convert the gradation of image data, and to an image processing device to which the image processing method can be applied.

2. Description of the Related Art

In research and development of photosensitive materials such as photographic films, photographic printing papers and the like, it is known that, in order to realize vivid color formation of a photographed image, when a photosensitive material is exposed by using a monochromatic light whose main light is a specific color component (RGB), the developing suppressing effect from other color photosensitive layers weakens (the so-called interlayer effect) as compared to a case in which exposure is carried out by using white light. As a result, the photosensitive layers must be designed such that the saturation of the regions corresponding to chromatic photographed subjects is reproduced even higher than the saturation in regions corresponding to photographed subjects in the photographed image which are achromatic or nearly achromatic.

In images of landscapes or objects at rest, by increasing the saturation of chromatic photographed subjects throughout the entire image as described above, the image has an apparently vivid finish. However, for images which include humans as photographed subjects, when the saturation of skin-colored regions corresponding to the skin of persons in the image is increased more than needed due to the increase in the saturation of the entire image, a problem arises in that the photographed image does not have a preferable finish, for example, the redness of or pimples on a person's face or the like are emphasized more than needed. Thus, for image quality, there is a tradeoff between the saturation of the entire image and the saturation of the skin-colored regions.

On the other hand, in image processing carried out on digital image data, it is possible to relatively easily and freely adjust and change the color reproduction of the image. For example, in 3×3 matrix processing in which a 3×3 matrix is multiplied by each pixel for RGB 3-channel image data, if the diagonal elements of the 3×3 matrix are made to be values larger than 1 and the non-diagonal elements are made to be values smaller than zero, the saturation can be increased. If the diagonal elements of the 3×3 matrix are made to be values less than 1 and the non-diagonal elements are made to be values greater than zero, the saturation can be decreased. However, in this case as well, when the saturation of the entire image is increased, the skin-colored regions corresponding to the flesh of people in the image have a finish which is not preferable.

Further, Japanese Patent Application Laid-Open (JP-A) No. 6-124329 discloses a saturation changing circuit used in a structure in which, on the basis of an inputted color signal, a multiplication factor expressing the degree of enhancement of the saturation is determined by a saturation detecting circuit, and due to a saturation raising circuit multiplying the determined multiplication factor by the saturation signal, the saturation is raised. In the saturation changing circuit, a factor for skin-color judgement is set by the saturation detecting circuit. At a specific-color judging circuit, on the basis of the hue of the inputted signal and the factor set by the saturation detecting circuit, a judgement is made as to whether that hue falls within a range of skin color. In a case in which it is judged that the hue falls within the range of skin color, the multiplication by the saturation raising circuit (i.e., the raising of the saturation) is stopped.

However, in the aforementioned saturation changing circuit, the saturation is changed by turning the saturation raising by the saturation raising circuit on and off on the basis of whether the hue of the inputted signal falls within a range of skin color. Thus, when the saturation is changed by the saturation changing circuit, a problem arises in that the image quality deteriorates, such as the finish in the vicinity of the outer edges of regions at which the saturation is raised by the saturation raising circuit and regions at which the saturation is not raised is unnatural. Further, in the saturation changing circuit, when an attempt is made to suppress the raising of the saturation of a plurality of respectively different hues, it is necessary to provide a specific-color judging circuit for each of the hues for which raising of the saturation is to be suppressed, and a problem arises in that the structure of the device becomes complex.

Further, the color reproduction characteristics which are preferable at the time of reproducing an object, which is photographed by a camera, as an image on a recording medium differ in accordance with the type of the photographed object, the uses of the image, and the like. Thus, plural types of photographic photosensitive materials having respectively different characteristics are developed and produced as photographic photosensitive materials such as photographic films, photographic printing papers, and the like. For example, in a case in which photographing is carried out by a professional cameraman (especially photography at a photo studio or photography for portraiture) and photographic prints are prepared from the images recorded on the photographic film by this photographing, a photographic film or photographic printing paper is used which has a soft gradation (low contrast) characteristic by which it is difficult for over color and under color (color loss in gradation separation) to arise in the region corresponding to the face of a person in the image. On the other hand, for general photography or amateurs, vivid color prints are preferable, and therefore, photographic films or photographic printing papers having hard gradation (high contrast) characteristics are usually used.

Further, different types of photographic photosensitive materials are used for different types of photographed subjects, different applications of the images, and the like. For example, a photographer may select the photographic film and carry out photographing in accordance with his/her personal tastes or the type of the object to be photographed or the like. At the place of development to which the photographic film is brought and at which preparation of photographic prints is requested, for example, if the person placing the request is a professional cameraman, the preparation of the photographic prints may be carried out by using a photographic printing paper which has been developed for professional use (e.g., a photographic printing paper having a soft gradation characteristic).

However, in order realize such use of different types of photographic photosensitive materials for different types of photographed subjects or different applications of images or the like, it is necessary to prepare in advance plural types of photographic photosensitive materials having respectively different characteristics. Thus, the financial burden is heavy, and the work involved in properly using the different types of photographic photosensitive materials in accordance with the different types of photographed subjects, different applications of the images and the like is complex.

Thus, the image data, which is acquired by reading by photoelectric converting elements an image recorded on a photographic film, is converted in accordance with a gradation conversion characteristic which is determined in accordance with the type of the photographed subject, the application of the image, or the like. The image data which has been subjected to gradation conversion is used to record the image onto a photographic photosensitive material. In this way, photographic prints of a finish which corresponds to the type of the photographic object or the application of the image or the like can be prepared from one type or a few types of photographic photosensitive materials. However, when the gradation of the image data is converted, a problem arises in that an unintentional change in the image quality (especially a change in the saturation) arises.

As a related technique, JP-A No. 5-328132 discloses a digital image forming device such as a digital printer or a digital copier. When the user inputs a target gradation curve by an inputting section, an emitted light controlling section corrects the exposure data on the basis of the inputted gradation curve. Due to a color masking correcting section carrying out color masking correction in accordance with the input of the gradation curve, adjustment is carried out such that the (saturation and the like) of the output image does not change even if the gradation curve changes.

However, in the technique disclosed in the aforementioned publication, by carrying out matrix computation, color masking correction is realized, and the control of the hardness/softness of the gradation and the control of the increase/decrease in saturation can be made to correspond to each other. For example, when a gradation curve in which the saturation becomes high is selected, a masking factor which decreases the saturation is selected as the masking factor (matrix factor) used in color masking correction, and a change in the saturation can thereby be suppressed. The adjustment of the saturation change amount is carried out by adjusting the values of the non-diagonal elements of the masking factor.

Thus, in cases such as when a gradation curve whose slope (and in particular, slope from the highlight regions to the shadow regions) is not constant is selected, it is difficult to accurately correct the change in the image quality such as saturation or the like from the highlight regions to the shadow regions. A problem arises in that the accuracy of correction with respect to changes in image quality that accompany image gradation conversion is poor.

SUMMARY OF THE INVENTION

In view of the aforementioned, a first object of the present invention is to provide an image processing device and method in which it is possible to adjust the saturation of an image without leading to a deterioration in image quality.

Further, a second object of the present invention is to provide an image processing device and method in which changes in image quality which accompany conversion of gradation can be accurately corrected.

In order to achieve the above object, an image processing device relating to a first aspect of the present invention includes a storing section which stores conversion data of a conversion characteristic which changes, in units of respective pixels and by a predetermined amount, saturation, in a visible image, of image data used in output of the visible image; and a converting section which converts the image data used in output of the visible image in accordance with the conversion data stored in the storing section, wherein the conversion data stored in the storing section has a conversion characteristic which suppresses a change in saturation in the visible image for pixels belonging to a predetermined color region.

In an image processing device relating to a second aspect of the present invention according to the first aspect, the predetermined color region is a region in which a hue angle in the visible image falls within a predetermined range.

In an image processing device relating to a third aspect of the present invention according to the first aspect, the predetermined range is a range corresponding to skin (flesh) color.

In an image processing device relating to a fourth aspect of the present invention according to the first aspect, the predetermined color region includes at least one of a low saturation region where saturation in the visible image is low, and a high saturation region where saturation in the visible image is high.

In an image processing device relating to a fifth aspect of the present invention according to the first aspect, the predetermined color region includes at least one of a high lightness (luminosity) region where lightness in the visible image is high, and a low lightness region where lightness in the visible image is low.

In an image processing device relating to a sixth aspect of the present invention according to any one of the first to the fifth aspects, the conversion characteristic of the conversion data is set such that, the closer to a center of the predetermined color region, the greater a degree of suppression of change in saturation in the visible image for pixels positioned within the predetermined color region in a vicinity of a border thereof (a color gamut boundary).

In an image processing device relating to a seventh aspect of the present invention according to any one of the first to the fifth aspects, the conversion data is data which makes correspond a color value before a saturation change and a color value after the saturation change, when color values in the image data are changed such that saturation in the visible image changes.

In an image processing device relating to an eighth aspect of the present invention according to the first aspect, the conversion characteristic of the conversion data is set, on the basis of a color reproduction gamut (range) in an output form of the visible image, such that a change in saturation is not saturated.

In an image processing device relating to a ninth aspect of the present invention according to the first aspect, the image processing device further comprises: an instructing section for instructing a saturation change amount, wherein a plurality of types of conversion data having respectively different saturation change amounts are stored in the storing section, and the converting section converts image data by using, among the plurality of types of conversion data, conversion data which corresponds to a saturation change amount which is instructed via the instructing section.

In an image processing device relating to a tenth aspect of the present invention according to the ninth aspect, the saturation change amounts of the plurality of types of conversion data are respectively different by greater than or equal to a predetermined value, and in a case in which the saturation change amount instructed via the instructing section is a substantially intermediate value of saturation change amounts corresponding to any of the plurality of types of conversion data, the converting section, on the basis of conversion data corresponding to (a) saturation change amount(s) which approximate(s) the instructed saturation change amount, determines, by interpolation, conversion data corresponding to the instructed saturation change amount, and converts the image data by using the determined conversion data.

In an image processing device relating to an eleventh aspect of the present invention according to the first aspect, a plurality of types of output forms having respectively different color reproduction gamut (ranges) of the visible image are prepared as output forms of the visible image, and on the basis of the color reproduction ranges of the plurality of types of output forms, the storing section stores a plurality of types of conversion data whose conversion characteristics are set such that a change in saturation does not become saturated, and the converting section converts the image data by using conversion data corresponding to an output form which is used.

In an image processing device relating to a twelfth aspect of the present invention according to the first aspect, the image processing device further comprises: a designating section for designating a color region for which a change in saturation is to be suppressed; and a generating section for generating conversion data of a conversion characteristic which suppresses a change in saturation in the visible image, for pixels belonging to at least one of the predetermined color region and a color region designated via the designating section.

In an image processing device relating to a thirteenth aspect of the present invention according to the first aspect, the image processing device further comprises: a display section for displaying an image; and a display control section for making the display section display an image expressed by image data which is converted by the converting section.

In an image processing method relating to a fourteenth aspect of the present invention, conversion data of a conversion characteristic which changes, in units of respective pixels and by a predetermined amount, saturation, in a visible image, of image data used in output of the visible image, is stored, and the image data used in output of the visible image is converted in accordance with the stored conversion data, wherein the stored conversion data has a conversion characteristic which suppresses a change in saturation in the visible image for pixels belonging to a predetermined color region.

In order to achieve the above object, an image processing device relating to a fifteenth aspect of the present invention includes a converting section for converting image data; a designating section for designating a conversion characteristic of gradation conversion of the image data; and a control section for controlling a conversion characteristic of the converting section such that a gradation of the image data is converted in accordance with a conversion characteristic which is designated via the designating section, and for one of reconverting image data which is converted by the converting section and controlling the conversion characteristic of the converting section, such that changes in a ratio of a difference, of each of color components, with respect to gray of each pixel of the image data, which changes accompany conversion of the gradation of the image data in accordance with the designated conversion characteristic, are corrected.

In an image processing device relating to a sixteenth aspect of the present invention according to the fifteenth aspect, the image data is image data obtained by illuminating light onto a photographic film and converting light, which has passed through a region at which an image is recorded on the photographic film, into an electric signal by a photoelectric conversion sensor.

In an image processing device relating to a seventeenth aspect of the present invention according to the fifteenth aspect, the control section one of reconverts the image data and controls the conversion characteristic of the converting section, in accordance with a conversion characteristic which satisfies the following expressions: $R2'-(R2'+G2'+B2')/3 \approx R2-(R2+G2+B2)/3$, $G2'-(R2'+G2'+B2')/3 \approx G2-(R2+G2+B2)/3$, and $B2'-(R2'+G2'+B2')/3 \approx B2-(R2+G2+B2)/3$, where $R2'$, $G2'$, $B2'$ are color component values of respective pixels of image data when image data, whose gradation has been converted in accordance with the designated conversion characteristic, is converted, and $R2$, $G2$, $B2$ are color component values of respective pixels of image data when image data, whose gradation has not been converted, is converted.

In an image processing device relating to an eighteenth aspect of the present invention according to the fifteenth aspect, the control section includes a multidimensional look-up table, and sets, in the multidimensional look-up table, conversion data which is set such that changes in a ratio of a difference, of each of color components, with respect to gray of each pixel of the image data, which changes accompany conversion of the gradation of the image data by the converting section, are corrected, and reconverts, by the multidimensional look-up table at which the conversion data is set, image data which is converted by the converting section.

In an image processing device relating to a nineteenth aspect of the present invention according to the fifteenth aspect, the converting section converts the image data by a multidimensional look-up table, and the control section controls the conversion characteristic of the converting section by setting, in the multidimensional look-up table, conversion data of a conversion characteristic in which are superposed the conversion characteristic designated via the designating section and a conversion characteristic which corrects changes in a ratio of a difference, of each of color components, with respect to gray of each pixel of the image data at a time when gradation of the image data is converted in accordance with the conversion characteristic designated via the designating section.

In an image processing device relating to a twentieth aspect of the present invention according to the fifteenth aspect, the converting section converts the image data by a multidimensional look-up table, and the control section controls the conversion characteristic of the converting section by setting, in the multidimensional look-up table, conversion data of a conversion characteristic which converts, in accordance with the conversion characteristic designated via the designating section, only data corresponding to an achromatic color portion among image data inputted to the multidimensional look-up table.

In an image processing device relating to a twenty-first aspect of the present invention according to the fifteenth aspect, a slope of the conversion characteristic is designated via the designating section as the conversion characteristic of gradation conversion of the image data.

In an image processing device relating to a twenty-second aspect of the present invention according to the fifteenth aspect, when a range from highlight through shadow is divided into plural ranges, the conversion characteristic of gradation conversion of the image data is designated independently for each of the plural ranges via the designating section.

In an image processing device relating to a twenty-third aspect of the present invention according to the fifteenth aspect, the device further comprises a first storing section for storing plural types of conversion characteristics, wherein the conversion characteristic of gradation conversion of the image data is designated via the designating section by a specific conversion characteristic being selected from among the plural types of conversion characteristics stored in the first storing section.

In an image processing device relating to a twenty-fourth aspect of the present invention according to the fifteenth aspect, the device further comprises a second storing section for storing a conversion characteristic designated via the designating section, wherein the conversion characteristic of gradation conversion of the image data is designated by correction of the conversion characteristic stored in the second storing section being designated via the designating section.

In an image processing method relating to a twenty-fifth aspect of the present invention, when a conversion characteristic of gradation conversion of image data is designated via a designating section, a conversion characteristic of conversion of the image data is controlled such that a gradation of the image data is converted in accordance with a conversion characteristic which is designated via a designating section, and image data which is converted is reconverted or the conversion characteristic of conversion of the image data is controlled, such that changes in a ratio of a difference, of each of color components, with respect to gray of each pixel of the image data, which changes accompany conversion of the gradation of the image data in accordance with the designated conversion characteristic, are corrected.

In an image processing device relating to a twenty-sixth aspect of the present invention according to the fifteenth aspect, the control section reconverts the image data which is converted by the converting section or controls the conversion characteristic of the converting section, such that the ratio of the difference, of each of color components, with respect to gray of each pixel of the image data, due to the conversion of the gradation of the image data in accordance with the designated conversion characteristic, and a ratio of a difference, of each of color components, with respect to gray of each pixel of the image data, before the conversion of the gradation of the image data is performed, are substantially the same.

In an image processing method relating to a twenty-seventh aspect of the present invention according to the twenty-fifth aspect, the image data which is converted is reconverted or the conversion characteristic of conversion of the image data is controlled, such that the ratio of the difference, of each of color components, with respect to gray of each pixel of the image data, due to the conversion of the gradation of the image data in accordance with the designated conversion characteristic, and a ratio of a difference, of each of color components, with respect to gray of each pixel of the image data, before the conversion of the gradation of the image data is performed, are substantially the same.

In the first aspect of the present invention, conversion data of a conversion characteristic which changes, in units of respective pixels and by a predetermined amount, saturation, in a visible image, of image data used in output of the visible image, is stored in the storing section. The converting section converts the image data used in output of the visible image in accordance with the conversion data stored in the storing section. In this way, by outputting the visible image by using the image data which has been converted, a visible image, whose saturation has been changed by a predetermined amount, can be obtained.

The image data used in output of the visible image may be, for example, image data obtained by illuminating light onto a photographic film on which an image is recorded, and converting the light, which has passed through the photographic film, into an electrical signal by a photoelectric converting section. Or, the image data may be image data obtained by photographing a subject by a digital still camera, or image data which is generated by a computer. Further, examples of the output form of the visible image are recording onto a recording material such as photographic printing paper, display onto a display device such as a display, and the like.

The conversion characteristic which changes the saturation in the visible image by a predetermined amount is determined as follows. The relationship between color values (arbitrary physical amount values which express colors; e.g., values expressing colors by using an arbitrary color system) in the image data, and color values in the visible image at the time when the visible image is outputted by using the aforementioned image data. On the basis of this relationship, the color values in the original image are converted to the color values in the visible image. By a predetermined amount, the saturations of the color values in the visible image after conversion are changed. Further, on the basis of the aforementioned relationship, the color values, after the saturation has been changed by the predetermined amount, are concerted back into color values of the image data. In this way, color values in the image data corresponding to the visible image whose saturation has been changed by the predetermined amount, are determined, and can be determined on the basis of the relationship between the color values of the image data and the color values of the original image data.

As in the seventh aspect of the present invention, the conversion data stored in the storing section may, for example, be data which makes correspond a color value before a saturation change and a color value after the saturation change, when color values in the image data are changed such that saturation in the visible image changes. For example, the color values themselves may be stored as conversion data, or a function or the like representing the conversion characteristic may be stored as the conversion data.

Here, in the first aspect of the present invention, the conversion data which is stored in the storing section has a conversion characteristic which suppresses a change in saturation in the visible image for pixels belonging to a predetermined color region. The predetermined color region may be a color region which leads to a deterioration in image quality of the visible image when the saturation in the visible image changes greatly. A color region defined in an arbitrary color space or arbitrary color coordinate may be used. Further, the predetermined color region may be prescribed on the basis of color values in the image data. However, it is preferable that the predetermined color region be prescribed on the basis of color values in the visible image.

By converting the image data by using the conversion data of the above-described conversion characteristics, the visible image, which is outputted by using the image data which has undergone conversion by the converting section, is an image in which the change in saturation at portions corresponding to the predetermined color region is suppressed and the saturation at the other portions is changed by a predetermined amount. In the first aspect of the invention, because the conversion characteristic by the converting section is prescribed by the conversion data stored in the storing section, the conversion characteristic by the converting section can be freely controlled.

In this way, in order to prevent a deterioration in image quality at portions, which deterioration accompanies the changing of the saturation in the visible image by a predetermined amount, the conversion characteristic is determined such that, for example, the change in saturation in the visible image is suppressed for respective pixels belonging to any of a plurality of color regions. In this way, a change in saturation at portions corresponding to any of the plural color regions in the visible image can be suppressed. Or, as in the sixth aspect of the present invention, the conversion characteristic may be set such that, the closer to the predetermined color region, the greater a degree of suppression of change in saturation in the visible image for pixels positioned within the predetermined region in a vicinity of a border. In this way, the finish in the vicinity of an outer edge of a portion corresponding to a predetermined color region in the visible image can be prevented from being unnatural. Accordingly, in accordance with the first aspect of the present invention, the saturation of the image (the visible image) can be adjusted without leading to a deterioration in image quality.

In the first aspect of the present invention, the predetermined color region may be stipulated, as in the second aspect for example, as a region in which a hue angle in the visible image falls within a predetermined range. When the colors of the visible image are expressed by the L*a*b* color system which is the uniformly perceived color space recommended by the CIE (Commission Internationale de l'Eclairage), the hue angle H* is defined by following formula (1):

$$H^* = \tan^{-1}(b^*/a^*) \cdot 180/\pi \quad (1)$$

As described above, by stipulating the predetermined color region by the hue angle in the visible image, the change in saturation of pixels of a specific hue in the visible image can be suppressed.

In the second aspect of the present invention, it is preferable that, for example, the predetermined range is a range corresponding to skin color, as in the third aspect of the present invention. Note that the range corresponding to skin color is a range centered around hue angle $H^* \approx 45°$. By making the predetermined color region of the present invention a range in which hue angles are values corresponding to skin color as described above, the change in saturation of portions, in the visible image, corresponding to the skin of persons can be suppressed. A deterioration in image quality in portions, which deterioration accompanies the changing of the saturation of the visible image, can effectively be suppressed.

Note that the predetermined range of the second aspect is not limited to a range corresponding to skin color as described above. For example, when the saturation of the entire image is greatly raised, portions corresponding to the green of trees or grass existing within the image have an unnatural finish. The range corresponding to green color is centered around hue angle $H^*=135°$. Thus, the predetermined color region relating to the present invention may be a range in which the hue angles are values corresponding to green color. Or, a range in which the hue angles are values corresponding to skin color and a range in which the hue angles are values corresponding to green color may both be used as predetermined color regions of the present invention.

In the first aspect of the present invention, the predetermined color region relating to the invention may be, for example, prescribed by the saturation in the visible image. For example, as in the fourth aspect of the present invention, it is preferable that the predetermined color region includes at least one of a low saturation region where saturation in the visible image is low, and a high saturation region where saturation in the visible image is high.

Namely, for example, when the saturation of the entire visible image is raised uniformly regardless of the saturations at the respective portions, the saturations at portions where the saturation is a minimal value or near a minimal value (portions whose hue is a neutral color (gray) or is near a neutral color) are also raised. Thus, in the visible image after the saturation has been raised, the non-neutral color components included in these portions are emphasized such that it appears that there is color in these gray portions, and a problem arises in that this is perceived as a deterioration in image quality. Further, at portions where the saturation is originally a maximum value or a near a maximum value, the saturation may rise so as to exceed the color reproduction range of the visible image such that the rise in saturation is saturated (although this depends on the amount of increase in saturation and other parameters as well) Thus, a deterioration in image quality, such as oversaturation or the like, may be caused.

Therefore, in accordance with the fourth aspect of the present invention, the change in saturation is suppressed at at least one of the low saturation portions where the saturation is low in the visible image and the high saturation portions where the saturation is high in the visible image. Thus, even in a case such as when the saturation of the visible image is greatly raised, a deterioration in image quality of at least one of the low saturation portions and the high saturation portions in the visible image can be prevented.

In the fourth aspect of the present invention, the amount of change in saturation for the low saturation region can be set such that the saturation suppression amount for pixels whose saturation is zero in the visible image is a maximum (e.g., saturation change amount=0), and the saturation suppression amount gradually decreases as the saturation in the visible image of the pixels which are the object of saturation changing increases. Further, for the saturation change amount for high saturation regions as well, the saturation suppression amount for pixels of the maximum saturation which can be expressed in the visible image (saturation in the outermost shell of the color reproduction range) is a maximum (e.g., the saturation change amount=0), and as the saturation in the visible image of pixels which are the object of saturation changing decreases, the saturation suppression amount gradually decreases.

In the first aspect of the present invention, the predetermined color region relating to the present invention may be prescribed by lightness in the visible image. For example, as in the fifth aspect, it is preferable that the predetermined color region includes at least one of a high lightness region where lightness in the visible image is high, and a low lightness region where lightness in the visible image is low.

Namely, for example, when the saturation of the entire visible image is raised uniformly regardless of the lightness at the respective portions, the saturations at portions where the lightness in the visible image is a maximum value or near a maximum value (highlight portions in the visible image; regions which are usually white) are also raised. Thus, in the visible image after the saturation has been raised, the non-neutral color components included in these portions are emphasized such that it appears that there is color in the white regions, and a problem arises in that this is perceived as a deterioration in image quality. Further, at the high lightness portions and the low lightness portions, it appears as if the saturation has changed greatly as compared to the actual change in saturation. Thus, if the saturation of the entire visible image is raised uniformly, the change in saturation in the high lightness portions and the low lightness portions is perceived as a deterioration in image quality.

Therefore, in accordance with the fifth aspect of the present invention, the change in saturation is suppressed at at least one of the high lightness portions and the low lightness portions in the visible image. Thus, even in a case such as when the saturation of the visible image is greatly raised, a deterioration in image quality of at least one of the high lightness portions and low lightness portions can be prevented.

In the fifth aspect of the present invention, the amount of change in saturation for the high lightness portions can be set such that the saturation suppression amount for pixels of maximum lightness in the visible image is a maximum (e.g., saturation change amount=0), and the saturation suppression amount gradually decreases as the lightness, in the visible image, of the pixels which are the object of saturation changing decreases. Further, for the saturation change amount for low lightness portions as well, the saturation suppression amount for pixels of the lowest lightness in the visible image is a maximum (e.g., the saturation change amount=0), and as the lightness, in the visible image, of pixels which are the object of saturation changing increases, the saturation suppression amount gradually decreases.

In the invention of any of the first through fifth aspects, it is preferable that, as in the sixth aspect of the present invention, the conversion characteristic of the conversion data is set such that, the closer to the predetermined color region, the greater a degree of suppression of change in saturation in the visible image for pixels positioned within the predetermined color region in a vicinity of a border (i.e., the further from the predetermined color region, the lower the degree of suppression). In this way, the finish in the vicinity of the outer edge of portions corresponding to the predetermined color region in the visible image can be prevented from being unnatural.

However, the maximum saturation which can be expressed in the visible image (the saturation at the outermost shell in the color reproduction range of the visible image) differs in accordance with the output form of the visible image. For example, in a case in which a visible image is outputted by using image data which has undergone conversion by the converting section, the saturation will be appropriate in a visible image which is outputted in a given output form, whereas, in a visible image which is outputted in another output form, the change in saturation may become saturated such that a deterioration in image quality, such as oversaturation or the like, may occur.

In view of this fact, as in the eighth aspect of the present invention, it is preferable that the conversion characteristic of the conversion data is set, on the basis of a color reproduction range in an output form of the visible image, such that a change in saturation is not saturated. Setting the conversion characteristic such that the change in saturation is not saturated can be realized as follows: saturation values at the outermost shell can be determined as the color reproduction range for the output form of the visible image, and the conversion characteristic can be determined such that the saturation values in the visible image of the image data which has undergone conversion by the converting section do not exceed the saturation values of the outermost shell.

Further, because the saturation values at the outermost shell (range) change in accordance with the hue or lightness, for example, a patch of various hues, lightnesses and saturations may be output as the visible image, and the saturations in the visible image may be measured. In this way, the relationship between, on the one hand, the hues and lightnesses in the visible image and, on the other hand, the saturation values in the outermost shell can be determined in advance. The conversion characteristic can be set for each of the hues and lightnesses on the basis of the determined relationship. In this way, a deterioration in image quality, such as oversaturation or the like of the visible image, can be reliably prevented.

In the ninth aspect, a plurality of types of conversion data, whose saturation change amounts are respectively different, are stored. The image data is converted by using the conversion data which corresponds to the saturation change amount instructed via the instructing section. Thus, if the operator instructs a saturation change amount via the instructing section (e.g., an information input section such as a keyboard or a pointing device such as a mouse), the image data is converted such that the saturation in the visible image is changed by the instructed saturation change amount. Accordingly, a visible image, which has been adjusted to a saturation desired by the operator, can easily be obtained.

In the ninth aspect, in a case in which it is possible for the saturation change amount to be instructed via the instructing section in units of extremely small change amounts, a large number of conversion data whose saturation change amounts differ minutely can be stored in the storing section as the conversion data. However, in such a case, a problem arises in that an extremely large storage capacity is required in order to store the conversion data.

In consideration of this fact, in the tenth aspect of the present invention, it is preferable that different conversion data, whose saturation change amounts are greater than or equal to a predetermined value, are used as the plurality of types of conversion data, and that, in a case in which the saturation change amount instructed via the instructing section is an intermediate value of a saturation change amount corresponding to any of the plurality of types of conversion data, the converting section, on the basis of conversion data corresponding to a saturation change amount which approximates the instructed saturation change amount, determines, by interpolation, conversion data corresponding to the instructed saturation change amount, and converts the image data by using the determined conversion data. In this way, the storage capacity needed for storing the conversion data can be reduced.

In a case in which a plurality of types of output forms having respectively different color reproduction ranges of the visible image are prepared as output forms of the visible image, as in the eleventh aspect, it is preferable that, on the basis of the color reproduction ranges of the plurality of types of output forms, the storing section stores a plurality of types of conversion data whose conversion characteristics are set such that a change in saturation does not become saturated, and the converting section converts the image data by using conversion data corresponding to an output form which is used. In this way, in an environment in which plural types of output forms are prepared as output forms of the visible image, the conversion data of the optimal conversion characteristic can be selectively used in accordance with the output form of the visible image. A visible image, whose saturation is changed appropriately regardless of the output form of the visible image, can be obtained.

In the twelfth aspect of the invention, when a color region at which a change in saturation is to be suppressed is designated via the designating section, for the pixels belonging to at least one of the predetermined color region and the color region designated via the designating section, conversion data of a conversion characteristic which suppresses the change in saturation in the visible image is generated. Thus, by the operator designating via the designating section an arbitrary color region at which the change in saturation is to be suppressed, conversion data of a desired conversion characteristic is automatically generated.

In this way, even in a case such as when a color region at which the change in saturation is to be suppressed newly arises, the change in saturation at that color region can be suppressed by that color region being designated via the designating section. Thus, the saturation of the image can be changed at a desired conversion characteristic.

The designation of the color region at which the change in saturation is to be suppressed may be carried out by, for example, designating, by a numerical value (e.g., a numerical value which is normalized with the outermost shell as a reference), a parameter such as hue angle, saturation, lightness or the like which prescribes the color region. Or, parameters such as the hue angle, saturation, lightness or the like may be divided into plural numerical regions (e.g., high/intermediate/low). In this way, the color reproduction range can be divided in advance into a plurality of divisional color regions, and any of these divisional color regions may be designated as the region in which the saturation change is to be suppressed.

In the thirteenth aspect of the present invention, by referring to the image displayed on the display section, the operator can easily confirm whether or not the saturation has been changed appropriately.

In the fourteenth aspect of the present invention, in the same way as in the first aspect of the present invention, the saturation of the image can be adjusted without leading to a deterioration in image quality.

In the fifteenth aspect of the present invention, when a conversion characteristic of gradation conversion of image data is designated via the designating section, the control section controls the conversion characteristic of the converting section which converts the image data, such that the gradation of the image data is converted in accordance with the designated conversion characteristic. Further, the control section either reconverts the image data which has been subjected to conversion by the converting section, or controls the conversion characteristic of the converting section, such that changes in a ratio of a difference, of each of color components, with respect to the gray of each pixel of the image data, which changes accompany conversion of the gradation of the image data in accordance with the designated conversion characteristic, are corrected.

In this way, the image data are corrected by reconverting the image data or by controlling the conversion characteristic, such that a ratio of a difference, of each of the color components, with respect to the gray of each pixel of the image data whose gradation has been converted in accordance with the designated conversion characteristic, is the same as or substantially the same as that of the image data before gradation conversion. If the ratios of the differences of the respective color components to the gray are the same or substantially equal, the saturation and hue of each pixel is the same or substantially the same, even if the lightnesses are different. Thus, by correcting the image data as described above, changes in image quality, which changes accompany conversion of the gradation, can be corrected accurately across all of the regions from highlight regions through shadow regions.

As in the sixteenth aspect of the present invention, the image data of the fifteenth aspect may be image data obtained by illuminating light onto a photographic film, and converting light, which has passed through a region at which an image is recorded on the photographic film, into an electric signal by a photoelectric conversion sensor. Or, instead, the image data may be image data obtained by photographing by a digital still camera or a digital video camera, or may be image data generated by a computer, or the like.

In the fifteenth aspect of the present invention, reconverting of the image data by the control section or control of the conversion characteristic of the converting section by the control section may be realized as follows as in the seventeenth aspect of the present invention. Concretely, the control section may reconvert the image data or control the conversion characteristic of the converting section, in accordance with a conversion characteristic which satisfies the following expressions:

$$R2'-(R2'+G2'+B2')/3 \approx R2-(R2+G2+B2)/3$$

$$G2'-(R2'+G2'+B2')/3 \approx G2-(R2+G2+B2)/3$$

$$B2'-(R2'+G2'+B2')/3 \approx B2-(R2+G2+B2)/3$$

where $R2'$, $G2'$, $B2'$ are color component values of respective pixels of image data when image data, whose gradation has been converted in accordance with the designated conversion characteristic, is converted, and $R2$, $G2$, $B2$ are color component values of respective pixels of image data when image data, whose gradation has not been converted, is converted.

The $(R2'+G2'+B2')/3$ in the above expressions represents respective color component values of pixels whose hue is gray and whose lightness is substantially the same as that of pixels whose color component values are $R2'$, $G2'$, $B2'$. The above $(R2+G2+B2)/3$ represents respective color component values of pixels whose hue is gray and whose lightness is substantially the same as that of pixels whose color component values are $R2$, $G2$, $B2$. In accordance with the conversion characteristic which satisfies the above expressions, the image data is reconverted, or the conversion characteristic of the converting section is controlled. In this way, the saturation and the hue of each pixel of the image data whose gradation has been converted can be made to be the same as or substantially the same as the saturation and hue of each pixel of the image data before gradation conversion, regardless of the lightnesses of the respective pixels.

Further, correction of the change in the ratio of the difference, for each color component, with respect to the gray of each pixel of the image data can be realized by, for example, converting the image data by using a multidimensional look-up table. For example, in a case in which the control section is structured so as to include a multidimensional look-up table, as in the eighteenth aspect of the present invention, the control section sets, in the multidimensional look-up table, conversion data which is set such that changes in a ratio of a difference, of each of color components, with respect to gray of each pixel of the image data, which changes accompany conversion of the gradation of the image data by the converting section, are corrected, and reconverts, by the multidimensional look-up table at which the conversion data is set, image data which has undergone conversion by the converting section.

In a case in which the converting section is structured so as to convert the image data by a multidimensional look-up table, for example, as in the nineteenth aspect of the present invention, the control section controls the conversion characteristic of the converting section by setting, in the multidimensional look-up table, conversion data of a conversion characteristic in which are superposed a conversion characteristic designated via the designating section and a conversion characteristic which corrects changes in a ratio of a difference, of each of color components, with respect to gray of each pixel of the image data at a time when gradation of the image data is converted in accordance with the conversion characteristic designated via the designating section.

In a case in which the converting section is structured so as to convert the image data by a multidimensional look-up table, for example, as in the twentieth aspect of the present invention, the control section controls the conversion characteristic of the converting section by setting, in the multidimensional look-up table, conversion data of a conversion characteristic which converts, in accordance with a conversion characteristic designated via the designating section, only data corresponding to an achromatic color portion among image data inputted to the multidimensional look-up table. In this case, among the image data inputted into the multidimensional look-up table, the saturations and the hues of the data corresponding to the chromatic color portions do not change. Thus, a change in image quality accompanying a change in gradation can be suppressed.

Various methods can be contemplated as methods for designating the conversion characteristic of the gradation conversion of the image data. For example, as in the twenty-first aspect of the present invention, in the fifteenth aspect, the slope of the conversion characteristic may be designated via the designating section. In this case, although it is difficult for the operator to designate a complex conversion characteristic via the designating section, the operator can easily designate simple conversion characteristics.

For example, as in the twenty-second aspect of the present invention, when a range from highlight through shadow is divided into plural ranges, the conversion characteristic may be designated independently for each of the plural ranges by the designating section. In this case, the operator can accurately set a desired conversion characteristic.

Further, as in the twenty-third aspect of the present invention, a first storing section for storing plural types of conversion characteristics may be provided, and the conversion characteristic of gradation conversion of the image data may be designated via the designating section by a specific conversion characteristic being selected from among the plural types of conversion characteristics stored in the first storing section. In this case, a desired conversion characteristic may be set in advance and stored in the first storing section. Thus, even in cases such as when the desired conversion characteristic is a complex characteristic, designating of the conversion characteristic is easy.

Further, as in the twenty-fourth aspect of the present invention, a second storing section for storing a conversion characteristic designated via the designating section may be provided, and the conversion characteristic of gradation conversion of the image data may be designated by correction of the conversion characteristic stored in the second storing section being designated via the designating section. In this case, a conversion characteristic, which the operator has previously designated independently via the designating section and which has been stored in the second storing section, can be called up via the designating section and reused.

In an image processing method relating to a twenty-fifth aspect of the present invention, when a conversion characteristic of gradation conversion of image data is designated via a designating section, a conversion characteristic of conversion of the image data is controlled such that a gradation of the image data is converted in accordance with a conversion characteristic which is designated via a designating section, and image data which has undergone conversion is reconverted or the conversion characteristic of conversion of the image data is controlled such that changes in a ratio of a difference, of each of color components, with respect to gray of each pixel of the image data, which changes accompany conversion of the gradation of the image data in accordance with the designated conversion characteristic, are corrected. Thus, in the same way as the invention of the first aspect, a change in image quality which accompanies a change in gradation can be accurately corrected.

BRIEF DESCRIPTION OF THE DRAWINGS

FIG. 1 is a block diagram showing a schematic structure of an image processing system relating to an embodiment of the present invention.

FIG. 2 is a block diagram showing a schematic structure of a color reproduction conversion section.

FIG. 10 is an image diagram showing an example of a gradation conversion condition correction screen.

DETAILED DESCRIPTION OF THE PREFERRED EMBODIMENTS

Figure 3A:
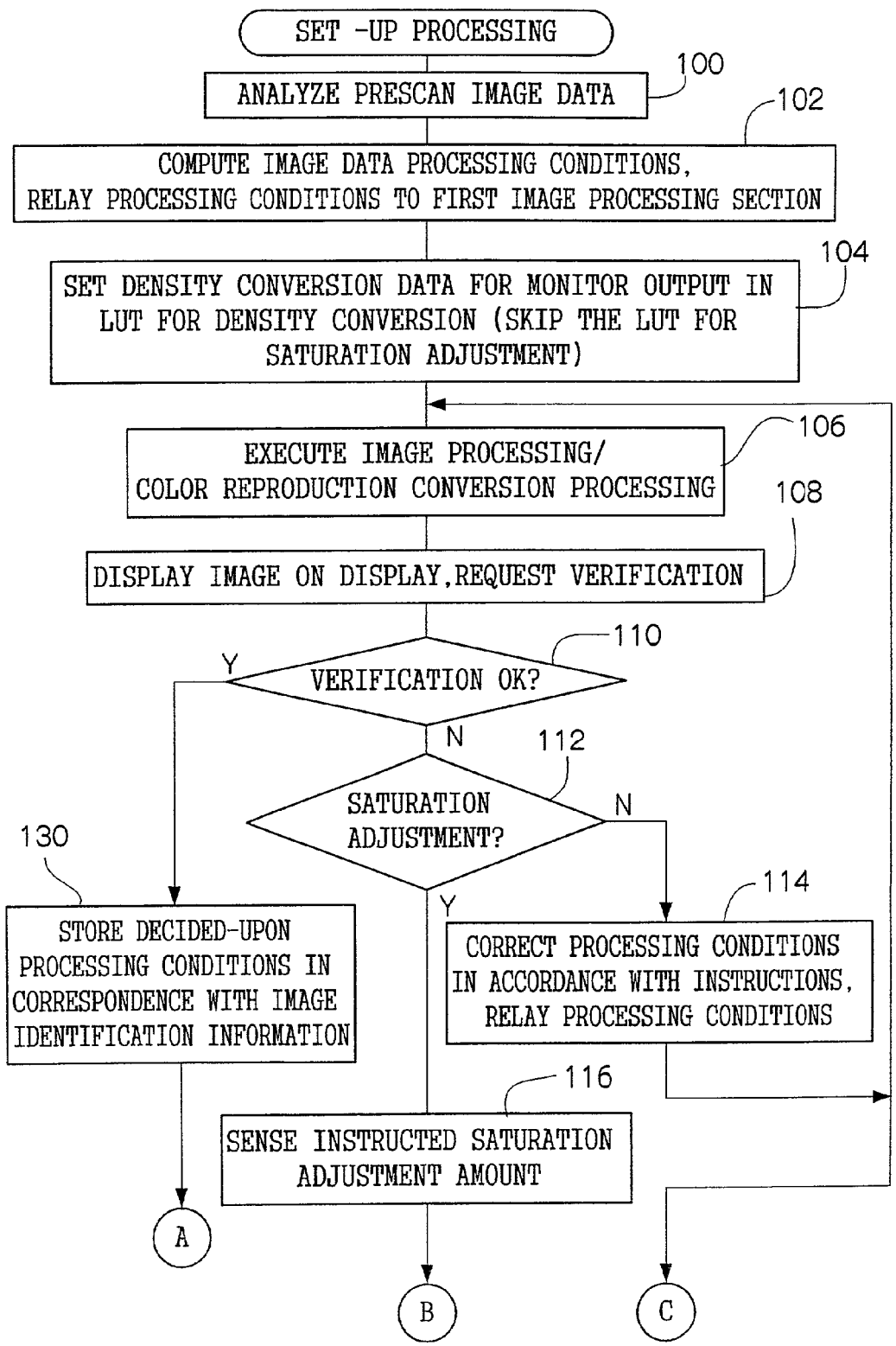
FIG. 3A is a flowchart showing set-up processing which is carried out at a set-up computation section.

Hereinafter, a first embodiment of the present invention will be described in detail with reference to FIGS. 1 through 6. FIG. 1 shows an image processing system 10 relating to the present embodiment. The image processing system 10 relating to the present embodiment is provided with a film scanner 12, a media driver 14, and an image data receiving device 16 as input devices for the input of image data. The image processing system 10 is provided with a CRT 20 for displaying an image, a laser printer 22 for exposing and recording an image onto a photographic printing paper, and a CD-R writing device 24 which writes image data onto a CD-R, as output devices for the output of images.

At the film scanner 12, light is illuminated onto a photographic film such as a negative film or a reversal film or the like. The light, which passes through the portion of the photographic film on which a film image is recorded (a negative image or a positive image which is made visible by the photographic film being subjected to developing processing after a subject is photographed), is read by a reading sensor (a line sensor or an area sensor) such as a CCD or the like. The film scanner 12 outputs the image data obtained by reading. Film images of, for example, 135 size photographic films, 110 size photographic films, photographic films on which a transparent magnetic layer is formed (240 size photographic films, known as an APS films), or 120 size or 220 size (Brownie size) photographic films may be the object of reading by the film scanner 12.

Any of various types of information storing media, such as magnetic disks like floppy disks (FD), optical disks like CD-Rs, magnetooptical disks (MO), PC cards, smart media, or IC cards which can be loaded in a digital still camera (DSC) (hereinafter, collectively referred to as "digital camera cards"), or the like is set in the media driver 14. The media driver 14 reads out the image data stored on the set information storing medium and outputs the image data.

The image data receiving device 16 is connected to a computer network such as the Internet, receives RGB image data from an information processing device (e.g., a personal computer (PC)) via the computer network, and outputs the received image data. The film scanner 12, the media driver 14, and the image receiving device 16 are connected to an image data pre-processing section 26 of the image processing device 18. The image data outputted from these image data input devices is inputted to the image data pre-processing section 26.

The image data pre-processing section 26 subjects the inputted image data to predetermined pre-processings which differ in accordance with the source of the inputted image data. Examples of pre-processings carried out on image data inputted from the film scanner 12 are dark correction, density conversion, shading correction, defective pixel correction, and the like. Examples of pre-processings carried out on image data inputted from the media driver 14 are decompression of image data which has been compressed and recorded on an information storing medium, image processings such as sharpness improvement, and the like. Examples of pre-processings carried out on image data inputted from the image data receiving device 16 are decompression of compressed image data (e.g., image data in JPEG format) received by the image data receiving device 16.

Output form designation information, which designates the output form of the image (whether the image should be exposed and recorded onto a recording material by the laser printer 22, or whether the image data should be written onto a CD-R by the CD-R writing device 24), is attached to image data inputted from the film scanner 12, the media driver 14 and the image data receiving device 16. This output form designation information is inputted, in the state of being attached to the image data, to various devices which will be described later.

The film scanner 12 relating to the present embodiment reads each film image recorded on a photographic film two times, each time at a different resolution. In the first reading (hereinafter, "prescanning") which is carried out at a relatively low resolution, reading is carried out under reading conditions which are determined so as to not cause problems such as saturation of the accumulated charge of the reading sensor, even if the density of the film image is extremely low (for example, even in the case of an underexposed negative image of a negative film).

A prescan memory 28 and a fine scan memory 30 are connected to the image data pre-processing section 26. A first image processing section 32 and a set-up computation section 34 are connected to the prescan memory 28. A second image processing section 36 is connected to the fine scan memory 30. When low resolution image data is inputted to the image data pre-processing section 26 from the film scanner 12 due to prescanning being carried out, the image data pre-processing section 26 subjects this low resolution image data to pre-processings, and thereafter, outputs the data to the prescan memory 28.

The image data pre-processing section 26 outputs, to the prescan memory 28 and the fine scan memory 30, the image data inputted from the media driver 14 and the image data inputted from the image data receiving device 16. The image data which is outputted to the prescan memory 28 is outputted to the prescan memory 28 after being converted into image data of a low resolution equivalent to the resolution of the low resolution image data obtained by prescanning. The low resolution image data outputted to the prescan memory 28 is inputted to the set-up computation section 34 via the prescan memory 28.

The set-up computation section 34 and the first image processing section 32 can be realized by a single microcomputer in which the CPU, ROM, RAM, and input/output port are connected together via a bus, and in which a storage device such as a hard disk device (HDD) is connected to the input/output port. By making this microcomputer execute predetermined programs, the microcomputer can be made to function as both the first image processing section 32 and the set-up computation section 34.

In a case in which the low resolution image data inputted via the prescan memory 28 is image data obtained by prescanning by the film scanner 12, on the basis of this low resolution image data, the set-up computation section 34 computes an image characteristic amount such as density or the like, and determines reading conditions for the time that the film scanner 12 is to read the prescanned photographic film again, this time at a relatively high resolution (hereinafter, "fine scanning"), and outputs the determined reading conditions to the film scanner 12.

On the basis of the inputted low resolution image data, the set-up computation section 34 automatically determines by computation (set-up computation) processing conditions for various types of processings to be carried out by the second image processing section 36 on the high resolution image data of the same image outputted from the image data pre-processing section 26 via the fine scan memory 30 to the second image processing section 36 (the image data inputted from the fine scanner 12 due to the fine scan, or the image data inputted from the media driver 14, or the image data inputted from the image data receiving device 16). The set-up computation section 34 also informs the first image processing section 32 of these determined processing conditions.

Examples of the image processings carried out at the second image processing section 36 are various processings for improving the image quality of the output image such as image gray balance adjustment, density adjustment, gradation control, hypertone processing for compressing the gradation of the ultra-low frequency luminance components of the image, hypersharpness processing for enhancing sharpness while suppressing graininess, and the like. Further, it is also possible to carry out image processings such as image processing for intentionally changing the image gradation (e.g., image processing to make the output image have a portrait finish), image processing for manipulating the image (e.g., image processing for making a person in the original image appear thinner in the main image), or the like.

On the basis of the processing conditions relayed from the set-up computation section 34, for the low resolution image data stored in the prescan memory 28, the first image processing section 32 carries out, on the low resolution image data, image processings which are equivalent to the image processings carried out at the second image processing section 36 on the high resolution image data, and generates simulation image data. A color reproduction conversion section 38 and a CRT 20 are connected in that order to the first image processing section 32. The simulation image data generated at the first image processing section 32 is outputted to the color reproduction conversion section 38. Note that the CRT 20 corresponds to the display section of the present invention.

As shown in FIG. 2, the color reproduction conversion section 38 is structured by a look-up table (LUT) 40 for density conversion, a selector 42, a three-dimensional look-up table (3D-LUT) 44 for saturation adjustment, and a selector 46 being connected in that order. The LUT 40 for density conversion is for converting the density of the inputted image data such that the density of the image expressed by the inputted image data is appropriately reproduced in the output image (the image which is made visible on a photographic printing paper in the output form of recording images on a photographic printing paper, or an image displayed on the CRT 20 by using the recorded image data in the output form of recording image data on a CD-R; such images correspond to the visible image of the present invention). The 3D-LUT 44 for saturation adjustment is for adjusting the saturation of the output image in a case in which adjustment of saturation is instructed. The output ends of the selector 46 are connected to the CRT 20, the laser printer 22, and the CD-R writing device 24.

The 3D-LUT 44 for saturation adjustment and the set-up computation section 34, which sets saturation adjustment data (to be described in detail later) in the 3D-LUT 44 for saturation adjustment, correspond to the converting section of the present invention.

The simulation image data which is outputted from the first image processing section 32 is subjected to color reproduction conversion processing (which will be described in detail later) such as density conversion or the like by the color reproduction conversion section 38, and thereafter, is outputted to the CRT 20 and displayed on the CRT 20 as a simulation image (output image). The finish and the like of the output image displayed on the CRT 20 can thus be verified by an operator.

A key correction input section 48 is connected to the set-up computation section 34. The key correction input section 48 may be formed by, for example, a keyboard or a mouse which is connected to the input/output port of the microcomputer. The operator who is verifying the output image displayed on the CRT 20 operates the key correction input section 48 so as to input the results of verification. When the operator has decided on the processing conditions through this verification, the set-up computation section 34 informs the second image processing section 36 of these decided-on processing conditions. Note that the key correction input section 48 corresponds to both the instructing section and the indicating section of the present invention.

The second image processing section 36 is provided with plural types of image processing circuits for carrying out the various types of image processings mentioned previously. When the high resolution image data is inputted from the image data pre-processing section 26 via the fine scan memory 30, the second image processing section 36 subjects the inputted high resolution image data to various types of image processings in accordance with the processing conditions which have been relayed from the set-up computation section 34. The second image processing section 36 is connected to the color reproduction conversion section 38. The image data outputted from the second image processing section 36 is subjected to color reproduction conversion processing at the color reproduction conversion section 38, and is then outputted to the laser printer 22 or the CD-R writing device 24. The image data is used to record an image onto a photographic printing paper by the laser printer 22, or is written onto a CD-R by the CD-R writing device 24.

The laser printer 22 is equipped with RGB laser light sources. The RGB laser lights emitted from the laser light sources are modulated on the basis of the image data inputted from the image processing device 18, and are deflected by a deflecting section such as a polygon mirror or the like so as to be scanned onto a photographic printing paper. An image is thereby exposed and recorded onto the photographic printing paper. The photographic printing paper on which the image has been exposed and recorded is sent to a processor section (not shown) where the photographic printing paper is subjected to various processings such as color developing, bleaching fixing, washing, and drying. In this way, the image which has been exposed and recorded on the photographic printing paper is made visible.

Figure 3B:
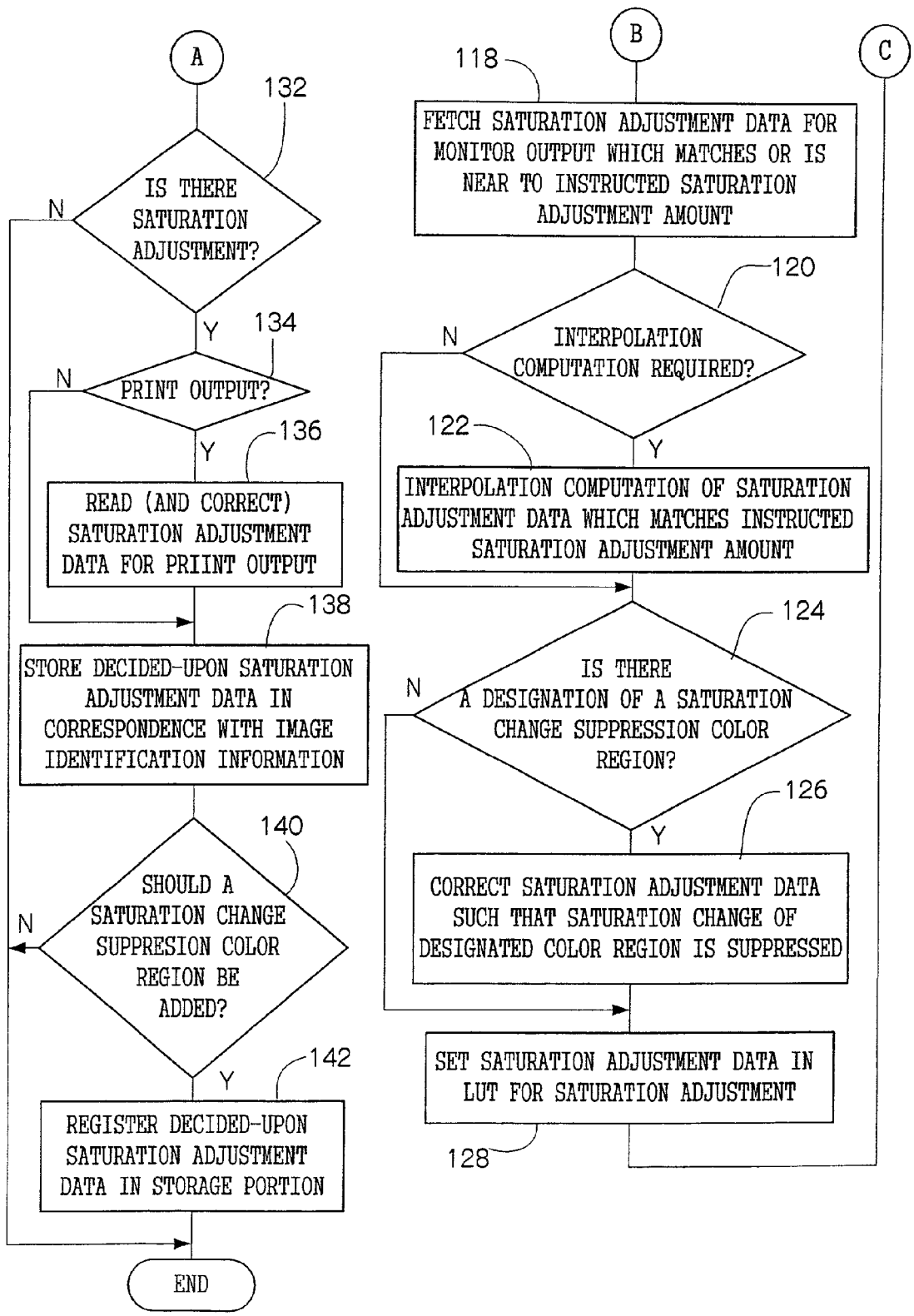
FIG. 3B is a flowchart showing set-up processing which is carried out at a set-up computation section.
Figure 4:
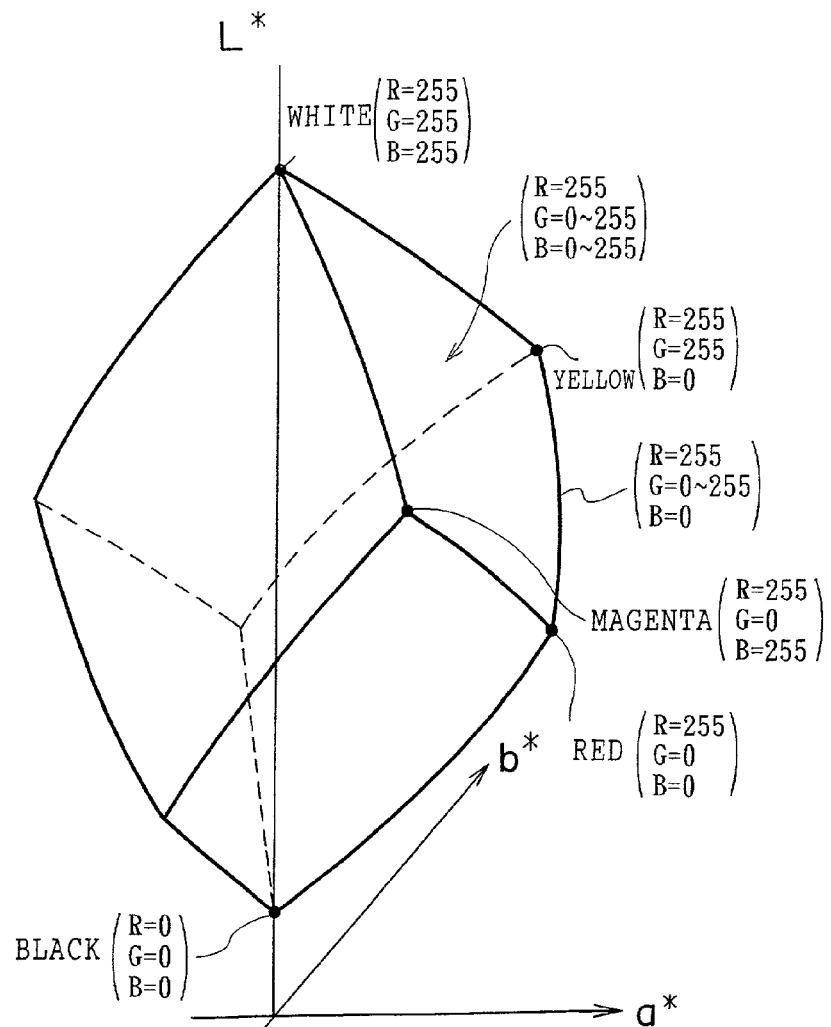
FIG. 4 is a schematic diagram showing an example of an outermost shell of a color reproduction region in an output image in an L*a*b* color space, and an example of a relationship between RGB and L*a*b* at the outermost shell.

Next, operation of the present embodiment will be described with reference to the flowchart in FIGS. 3A and 3B which show the set-up processing executed at the CPU of the set-up computation section 34. This set-up processing is executed by (the CPU of) the set-up computation section 34 each time the low resolution image data of a single image is stored in the prescan memory 28.

In step 100, the low resolution image data stored in the prescan memory 28 is fetched, and image data analysis including processings such extraction of the main portions in the image (e.g., the regions corresponding to the faces of persons (face regions)), computation of various types of image characteristic amounts, and the like, is carried out. In step 102, on the basis of the results of analysis of the image data in step 100, the optimal processing conditions for the image processing to be carried out at the second image processing section 36 on the high resolution image data are computed, and the first image processing section 32 is informed of these computed processing conditions.

Density conversion data, which is for converting, at the LUT 40 for density conversion, the density of the image data such that the density of the image expressed by the image data inputted to the color reproduction conversion section 38 can be reproduced appropriately in the output image, is stored in a storage portion 50 (formed by an HDD) of the set-up computation section 34.

The following three output forms are prepared as the image output forms in the present embodiment: displaying the image onto the CRT 20 (monitor display), recording the image onto a photographic printing paper by the laser printer 22 (print output), and writing the image data onto a CD-R by the CD-R writing device 24 (CD-R writing). However, because the image data written onto a CD-R is usually used in display onto a CRT monitor, when displaying the image data on the CRT monitor, it is preferable to display the image data on the CRT monitor at a preferable image quality without subjecting the image data to any particular post-processings. As a result, in the present embodiment, the density conversion data for monitor display and the density conversion data for CD-R writing are used in common, and two types of density conversion data, which are data for print output and data for monitor display/CD-R writing, are stored in the storage portion 50.

The processing at this time is processing for displaying the simulation image data, which was outputted from the first image processing section 32, on the CRT 20 as an image (output image), and for the operator to verify the finish of the output image by using the output image. Thus, in the subsequent step 104, the density conversion data for monitor display/CD-R writing is read out from the storage portion 50, and is set in the LUT 40 for density conversion of the color reproduction conversion section 38.

On the other hand, because the 3D-LUT 44 for saturation adjustment is an LUT which is used when the operator instructs adjustment of the saturation of the output image, in step 104, the selector 42 is switched such that the image data inputted to the selector 42 from the LUT 40 for density conversion is inputted directly to the selector 46, and the selector 46 is switched such that the image data inputted to the selector 46 is outputted to the CRT 20.

In step 106, on the low resolution image data stored in the prescan memory 28, various types of image processings are carried out by the first image processing section 32, and color reproduction conversion processing (in this case, only density conversion processing by the LUT 40 for density conversion) is carried out by the color reproduction conversion section 38.

In this way, the first image processing section 32 fetches the low resolution image data from the prescan memory 28, and on the basis of the processing conditions relayed by the processing of step 102, subjects the low resolution image data to image processings which are equivalent to the image processings carried out at the second image processing section 36 on the high resolution image data, and generates simulation image data. The simulation image data generated by the first image processing section 32 is density-converted by the LUT 40 for density conversion of the color reproduction conversion section 38, such that the "appearances" of the image displayed on the CRT 20 and the print to be obtained by exposing and recording the image onto a photographic printing paper match.

In step 108, the image data which has been subjected to color reproduction processing by the color reproduction conversion section 38 is outputted to the CRT 20. An image expressed by the image data is thereby displayed on the CRT 20 as an output image. A message requesting that the operator verify the output image displayed on the CRT 20 is also displayed on the CRT 20, so that the operator is made to verify the finish and the like of the respective portions of the output image displayed on the CRT 20.

When the output image is displayed on the CRT 20 and verification of the output image is requested, the operator visually confirms the output image displayed on the CRT 20, and verifies whether or not the image quality of the output image is appropriate, i.e., whether the processing conditions computed at the set-up computation section 34 are appropriate, and whether the saturation of the output image is appropriate. The operator inputs information expressing the results of verification via the key correction input section 48.

When the operator inputs information expressing the results of verification via the key correction input section 48, the routine moves on to step 110 where it is judged whether the information expressing the results of verification which the operator inputted via the key correction input section 48 is information meaning that the image has been verified to be satisfactory ("verification OK"). In a case in which information meaning "verification OK" has been inputted, the answer to the above determination is affirmative, and the routine moves on to step 130. However, in a case in which information instructing correction of the image processing conditions or information instructing adjustment of the saturation of the image is inputted as the information expressing the results of verification, it is judged that the results of verification by the operator are that the image is unsatisfactory ("verification NG (no good)"), and the routine moves on to step 112.

In step 112, it is judged whether the information expressing the inputted results of verification is information instructing adjustment of the saturation of the image. In a case in which information instructing correction of the image processing conditions has been inputted, the determination in step 112 is negative, and the routine moves on to step 114. In step 114, the image processing conditions computed in previous step 102 are corrected in accordance with the inputted instructions, and the first image processing section 32 is informed of the corrected processing conditions. Thereafter, the routine returns to step 106.

In this way, at the first image processing section 32, processing for regenerating the simulation image data is carried out in accordance with the corrected processing conditions, and the regenerated simulation image data is subjected to density conversion by the LUT 40 for density conversion of the color reproduction conversion section 38, and then outputted to the CRT 20. In this way, an output image is displayed on the CRT 20 on the basis of the processing conditions which have been corrected in accordance with the inputted correction instructions. Due to the operator visually confirming the output image displayed on the CRT 20 this time, the operator can easily judge whether or not the contents of the inputted correction instructions are appropriate.

On the other hand, in a case in which it is determined that the saturation of the output image displayed on the CRT 20 is inappropriate, the operator inputs, via the key correction input section 48, information instructing adjustment of the saturation of the image (specifically, information instructing the saturation adjustment amount or other information). Note that, in the present embodiment, adjustment of the saturation is possible only in the direction of increasing the saturation, and the saturation adjustment amount instructed by the operator is an amount of increase in the saturation.

When the operator inputs information instructing adjustment of the saturation, the answer to the determination in step 110 is negative and the answer to the determination in step 112 is affirmative, and the routine moves on to step 116.

In steps from step 116 on, processing for adjusting the saturation of the image is carried out by the 3D-LUT 44 for saturation adjustment of the color reproduction conversion section 38. However, before this processing is described, an explanation will first be given of the saturation adjustment data which is set in the 3D-LUT 44 for saturation adjustment at the time when adjustment of the saturation of the image is carried out by the 3D-LUT 44 for saturation adjustment.

Saturation adjustment data, which is for adjustment of the saturation in the output image by the 3D-LUT 44 for saturation adjustment, is stored (registered) in advance in the storage portion 50 (which is formed from an HDD) of the set-up computation section 34. This saturation adjustment data is data which makes the RGB values of the individual pixels of the image data before saturation adjustment and the RGB values of the individual pixels of the image data after saturation adjustment correspond to one another. The saturation adjustment data changes the saturation in the output image by using as a reference a saturation adjustment amount $\Delta C$ for each individual pixel, and has a conversion characteristic which, for pixels belonging to a predetermined color region, converts the image data such that the change in saturation is suppressed. The saturation adjustment data corresponds to the conversion data relating to the present invention, and the storage portion 50 corresponds to the storing section relating to the present invention.

As shown as an example in following Table 1, plural types of saturation adjustment data D are prepared in accordance with the output forms of images and the values of the saturation adjustment amounts $\Delta C$ for images. (In Table 1, the saturation adjustment data corresponding to "print output" at the time when the saturation adjustment amount $\Delta C$ is increased by x each time are denoted by $D_{P1}$, $D_{P2}$, $D_{P3}$, ..., and the saturation adjustment data corresponding to "monitor display/CD-R writing" at the time when the saturation adjustment amount $\Delta C$ is increased by x each time are denoted by $D_{M1}$, $D_{M2}$, $D_{M3}$, ....) These plural types of saturation adjustment data D are stored in the storage portion 50.

TABLE 1

Saturation Adjustment Data Table

| | | saturation adjustment amount $\Delta C$ | | | |
|---|---|---|---|---|---|
| | | +x | +2x | +3x | ... |
| output form | print output | $D_{P1}$ | $D_{P2}$ | $D_{P3}$ | ... |
| | monitor display/CD-R writing | $D_{M1}$ | $D_{M2}$ | $D_{M3}$ | ... |

The saturation adjustment data is set, for example, as will be described hereinafter. Namely, first, the relationship between the density values (hereinafter, "RGB values") of the respective color components of the image data (RGB in the present embodiment), and the L*a*b* in the output image at the time the image is outputted by using that image data is determined for each output form (L*a*b* is the color system recommended as a uniformly perceived color space by CIE, wherein L* is a lightness index, and a*b* are the perceived chromaticities). Specifically, patches of various colors (colors having different combinations of RGB values) are outputted as images, and the L*a*b* of each patch in the output image is measured by a measuring device for each output form.

Then, for colors for which patches are not prepared, for each of the output forms, the relationship between the RGB values of the image data and the L*a*b* values in the output image is determined by interpolation computation. Thus, the relationships between the RGB values of the image data and the L*a*b* values in the output image are determined for the entire color reproduction region of the output image. In this way, as shown as an example in FIG. 4, the relationships between the RGB values of the image data and the L*a*b* values in the output image at an outermost shell (points at which one color among RGB is a minimum value (e.g., zero) or a maximum value (e.g., 255 when the density is expressed by 8-bit data)) of the color reproduction range in the output image can be determined at the same time.

Next, for all combinations of the RGB values of the image data, on the basis of the relationships determined as described above, the RGB values are converted into L*a*b* values in the output image. Further, conversion of the L*a*b*, which are obtained by conversion, into L*C*H* is carried out for each of the output forms. H* is the hue angle and is determined by formula (1) which was previously put forth herein. C* is saturation and can be determined from the perceived chromaticities a*b* in accordance with the formula $C^* = \sqrt{(a^{*2}+b^{*2})}$. In this way, the respective saturations C* in the output image when the image is output in each of the output forms can be determined, for all of the combinations of RGB values of the image data.

Next, among the L*C*H* in the output image corresponding to all of the combinations of RGB values of the image data, the values of the saturations C* are adjusted, with reference to the predetermined saturation adjustment amount $\Delta C$, such that the desired change in saturation arises in the output image. In the present embodiment, saturation adjustment is carried out by respectively converting the saturations C* in the output image, which correspond to all of the combinations of RGB values of the image data, in accordance with following expression (2):

$$C^{*\prime} \leftarrow C^* + \alpha(\Delta C)$$

wherein C* represents the saturation before saturation adjustment, C*' represents the saturation after saturation adjustment, $\Delta C$ is the saturation adjustment amount, and $\alpha$ is a weighting factor of the saturation adjustment amount. As is clear from the above formula, the saturation adjustment amount varies in accordance with the value of the weighting factor $\alpha$ of the saturation adjustment amount.

In the present embodiment, the weighting factor $\alpha$ of the saturation adjustment amount is the product of a first weighting factor $\alpha_1$, a second weighting factor $\alpha_2$, and a third weighting factor $\alpha_3$. (Instead, the minimum value of the weighting factors $\alpha_1$ through $\alpha_3$ may be used as the weighting factor $\alpha$.) The first through third weighting factors $\alpha_1$ through $\alpha_3$ are determined as described hereinafter.

Figure 5A:
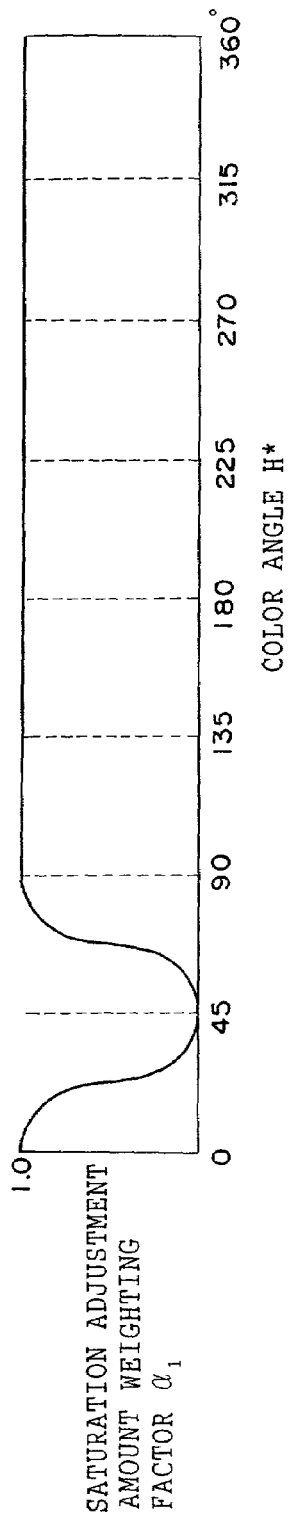
FIG. 5A is a graph showing a relationship between hue angle and saturation adjustment amount weighting factors in saturation adjustment data.

Namely, the first weighting factor $\alpha_1$ is a function of the hue angle H* in the output image ($\alpha_1 = f(H^*)$), and, for example, the relationship with the hue angle H* is predetermined as shown in FIG. 5A. The pattern of the first weighting factor $\alpha_1$ shown in FIG. 5A is determined such that, in a predetermined range (e.g., a range corresponding to skin color) which is centered around hue angle $H^* \approx 45°$, the first weighting factor $\alpha_1$ is zero or a value near zero, and the first weighting factor $\alpha_1$ increases the more that the hue angle H* moves away from the predetermined range in a vicinity of the predetermined range. Note that the color region corresponding to the aforementioned "predetermined range which is centered around hue angle H*≈45°'" corresponds to the predetermined color region in the present invention.

Figure 5B:
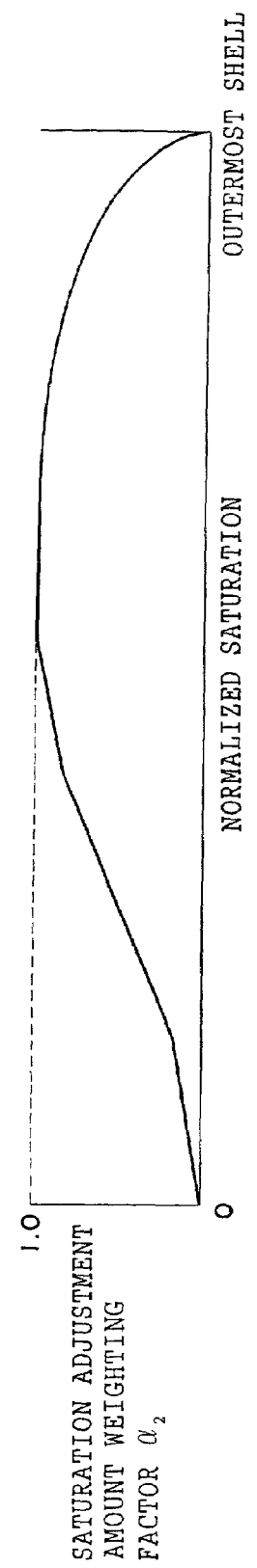
FIG. 5B is a graph showing a relationship between saturation and saturation adjustment amount weighting factors in saturation adjustment data.

The second weighting factor $\alpha_2$ is a function of the normalized saturation in the output image ($\alpha_2$=f(normalized saturation)). For example, the relationship with the normalized saturation is predetermined as shown in FIG. 5B. The normalized saturation is a value in which the saturation C* is normalized with reference to the saturation C* at the outermost shell of the color reproduction region of the output image. The pattern of the second weighting factor $\alpha_2$ shown in FIG. 5B is determined such that, when the normalized saturation is zero, the second weighting factor $\alpha_2$ is zero, and in a range in which the normalized saturation is less than a predetermined value, the slope of the increase in the value of the second weighting factor $\alpha_2$ with respect to the increase in the normalized saturation is extremely small, and in a range in which the normalized saturation is less than the predetermined value, the second weighting factor $\alpha_2$ is zero or a value near zero, and in a vicinity of a range less than the predetermined value, the second weighting factor $\alpha_2$ gradually increases as the normalized saturation moves away from the range.

The pattern of the second weighting factor $\alpha_2$ is such that, when the normalized saturation is a maximum value (a saturation corresponding to the outermost shell), the second weighting factor $\alpha_2$ is zero, and the value of the second weighting factor $\alpha_2$ increases as the normalized saturation decreases from the maximum value. Thus, the pattern of the second weighting factor $\alpha_2$ is determined such that, in a range in which the normalized saturation is a maximum value or near a maximum value, the second weighting factor $\alpha_2$ is zero or a value near zero. Note that the color region corresponding to the aforementioned "range in which the normalized saturation is less than a predetermined value" and the color region corresponding to the "range in which the normalized saturation is a maximum value or near a maximum value" correspond to the predetermined color regions relating to the present invention.

Figure 5C:
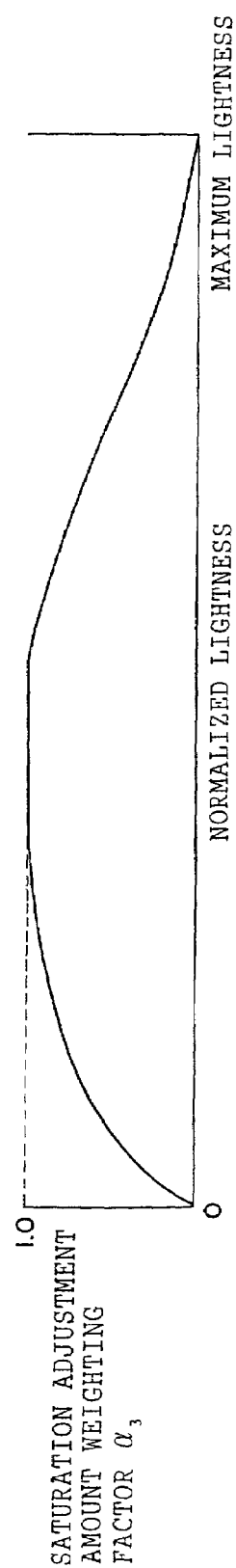
FIG. 5C is a graph showing a relationship between lightness and saturation adjustment amount weighting factors in saturation adjustment data.

The third weighting factor $\alpha_3$ is a function of the normalized lightness in the output image ($\alpha_3$=f(normalized lightness)). For example, the relationship with the normalized lightness is predetermined as shown in FIG. 5C. The normalized lightness is a value in which the lightness index L* is normalized with reference to the maximum value of the lightness indices L* in the output image (i.e., with reference to the lightness index L* in the output image corresponding to the RGB value (e.g., R, G, B=255) at which the lightness of the image data is a maximum). The pattern of the third weighting factor $\alpha_3$ shown in FIG. 5C is determined such that, when the normalized lightness is zero, the third weighting factor $\alpha_3$ is zero, and as the normalized lightness increases from zero, the value of the third weighting factor $\alpha_3$ increases, and thus, in a range in which the normalized lightness is zero or a value near zero, the third weighting factor $\alpha_3$ is zero or a value near zero.

The pattern of the third weighting factor $\alpha_3$ is determined such that, when the normalized lightness is a maximum lightness, the third weighting factor $\alpha_3$ is zero, and in a range in which the normalized lightness is greater than or equal to a predetermined value near the maximum lightness, the slope of the increase in the value of the third weighting factor $\alpha_3$ with respect to a decrease in the normalized lightness is extremely small, and in a range in which the normalized lightness is greater than or equal to the predetermined value, the third weighting factor $\alpha_3$ is zero or a value near zero, and in a vicinity of the range greater than or equal to the predetermined value, the third weighting factor $\alpha_3$ gradually increases as the normalized lightness moves away from the range.

Note that the color region corresponding to the aforementioned "range in which the normalized lightness is zero or a value near zero" and the color region corresponding to the "range in which the normalized lightness is greater than or equal to a predetermined value" correspond to the predetermined color regions relating to the present invention.

For the saturations C* in the output image corresponding to all of the combinations of RGB values of the image data, first through third weighting factors $\alpha_1$ through $\alpha_3$ are derived and saturation adjustment weighting factors a are respectively determined from the hue angle H*, the normalized saturation, and the normalized lightness in the output image. By substituting the determined weighting factors $\alpha$ and saturation adjustment amounts $\Delta$C into above formula (2), the saturations C* in the output image corresponding to all of the combinations of RGB values of the image data are respectively adjusted.

Then, the values of L*C*H* after the saturation C* has been adjusted are converted back into values of L*a*b* of the output image, and the values of L*a*b* are then converted back into RGB values of the image data. In this way, for all combinations of the RGB values of the image data, RGB values at the time the saturations C* are converted with reference to the saturation adjustment amounts $\Delta$C in the output image and on the basis of the weighting factors $\alpha_1$ through $\alpha_3$, are respectively obtained.

The saturation adjustment data can be obtained by making the RGB values after saturation adjustment and the RGB values before saturation adjustment correspond to each other. In this way, the saturations in the output image are converted by using, as a reference, the saturation adjustment amounts $\Delta$C for each of the pixels. Further, for the pixels belonging to predetermined color regions (i.e., the color region corresponding to a predetermined range centered around hue angle H*≈45°, the color region corresponding to a range in which the normalized saturation is less than a predetermined value, the color region corresponding to a range in which the normalized saturation is a maximum value or near a maximum value, the color region corresponding to a range in which the normalized lightness is zero or near zero, and the color region corresponding to a range in which the normalized lightness is a predetermined value or more), saturation adjustment data of a conversion characteristic, which converts image data such that the change in saturation is suppressed, can be obtained.

The 3D-LUT 44 for saturation adjustment can be structured such that all of the RGB values after saturation adjustment corresponding to all of the combinations of RGB values of the image data are stored as saturation adjustment data, and when an RGB value before saturation adjustment is inputted, the corresponding RGB value after saturation adjustment is merely read out and outputted. However, in this case, the data amount of the respective saturation adjustment data is extremely large, and thus, a problem arises in that a memory having an extremely large storage capacity is required for the 3D-LUT 44 for saturation adjustment and the storage portion 50.

As a result, in a case in which the RGB values after saturation adjustment, which correspond to all of the combinations of RGB values of the image data, are appropriately thinned to form the saturation adjustment data, and the RGB values after saturation adjustment, which correspond to the inputted RGB values before saturation adjustment, are not stored in the 3D-LUT 44 for saturation adjustment as saturation adjustment data, it is preferable that the RGB values after saturation adjustment corresponding to the RGB values before saturation adjustment are determined by interpolation computation from the RGB values after saturation adjustment which are stored as the saturation adjustment data. In this way, the storage capacity required for the 3D-LUT 44 for saturation adjustment and the storage portion 50 can be reduced.

In step 116 of the set-up processing (FIGS. 3A and 3B), the saturation adjustment amount instructed by the operator operating the key correction input section 48 is sensed. In subsequent step 118, among the saturation adjustment data stored in the storage portion 50, the saturation adjustment data, which corresponds to the "monitor display/CD-R writing" and whose corresponding saturation adjustment amount ΔC matches the saturation adjustment amount which is instructed, is fetched.

In the present embodiment, the saturation adjustment data for each time the saturation adjustment amount ΔC increases by x are stored. Thus, cases may arise in which saturation adjustment data, whose corresponding saturation adjustment amount ΔC matches the saturation adjustment amount which has been instructed, does not exist. However, in such a case, in step 118, a plurality of saturation adjustment data, whose corresponding saturation adjustment amounts ΔC are near the saturation adjustment amount which has been instructed, are fetched.

This step 118, step 128 which will be described later, and the 3D-LUT 44 for saturation adjustment correspond to the converting section recited in the ninth and eleventh aspects.

In subsequent step 120, a determination is made as to whether saturation adjustment data, whose corresponding saturation adjustment amount ΔC matches the saturation adjustment amount which was instructed, is stored in the storage portion 50, i.e., whether it is necessary to compute by interpolation the saturation adjustment data. When the answer to the determination is negative, the routine moves on to step 124 without any processings being carried out. However, in a case in which a plurality of saturation adjustment data are fetched in step 118, the answer to the determination in step 120 is affirmative, and the routine moves on to step 122. In step 122, on the basis of the fetched plurality of saturation adjustment data, saturation adjustment data whose corresponding saturation adjustment amount ΔC matches the instructed saturation adjustment amount, is determined by interpolation computation. This step 122 corresponds to the converting section recited in the tenth aspect.

In next step 124, a determination is made as to whether a color region for which a change in saturation should be suppressed has been indicated. Indication of the color region will be explained later. If the answer to the determination in step 124 is negative, the routine moves on to step 128. In step 128, the instructed saturation adjustment data is set in the 3D-LUT 44 for saturation adjustment, and the selector 42 is switched such that the image data inputted to the selector 42 from the LUT 40 for density conversion is inputted to the 3D-LUT 44 for saturation adjustment.

In this way, the simulation image data is regenerated at the first image processing section 32. The density of the regenerated simulation image data is converted by the LUT 40 for density conversion of the color reproduction conversion section 38, and thereafter, the simulation image data is inputted to the 3D-LUT 44 for saturation adjustment. The image data which is inputted to the 3D-LUT 44 for saturation adjustment is converted, by the 3D-LUT 44 for saturation adjustment, into image data after saturation adjustment for each pixel, and is outputted to the CRT 20 and displayed on the CRT 20 as an output image whose saturation has been adjusted. Note that the processing of displaying the output image on the CRT 20 at this time (step 108) corresponds to the display control section recited in the thirteenth aspect.

As described above, the saturation adjustment data set in the 3D-LUT 44 for saturation adjustment is data which is set on the basis of the color reproduction range of the output image displayed on the CRT 20 (specifically, on the basis of the relationship between the RGB values of the image data and the L*a*b* values (L*C*H* values) in the output image displayed on the CRT 20). The corresponding saturation adjustment amounts ΔC match the saturation adjustment amounts which have been instructed. The saturation adjustment data has a conversion characteristic which converts image data such that a change in saturation is suppressed for pixels belonging to predetermined color regions (i.e., the color region corresponding to a predetermined range centered around hue angle H*≈45°, the color region corresponding to a range in which the normalized saturation is less than a predetermined value, the color region corresponding to a range in which the normalized saturation is a maximum value or near a maximum value, the color region corresponding to a range in which the normalized lightness is zero or near zero, and the color region corresponding to a range in which the normalized lightness is a predetermined value or more).

Thus, at the output image displayed on the CRT 20, on the whole, in a case in which a change in saturation (an increase in saturation) corresponding to the saturation adjustment amount instructed by an operator arises and the apparent vividness of the output image improves and there are portions corresponding to the skin of a human in the original image, changes in saturation of these portions in the output image are suppressed. Thus, a deterioration in image quality of the output image, such as, for example, redness or pimples of a person's face being emphasized more than needed, can be prevented.

Further, in a case in which there exist neutral color portions in the original image (portions whose hue is a neutral color or near a neutral color), the neutral colored portions can be prevented from becoming colored in the output image. Further in a case in which there exist high saturation portions in the original image (portions whose saturation is a maximum value or near a maximum value), oversaturation (the change in saturation being saturated) can be prevented from occurring at the high saturation portions in the output image, and the saturation of the highlight portions (high lightness portions) and shadow portions (low lightness portions) of the original image can be prevented from changing greatly in the output image as compared to the instructed saturation adjustment amount.

As is clear from FIGS. 5A through 5C as well, the conversion characteristic of the saturation adjustment data set in the 3D-LUT 44 for saturation adjustment is determined such that, in a vicinity of a predetermined color region which is the object of saturation change suppression, the extent of the suppression of a change in saturation decreases as the distance from the predetermined color region increases. Thus, in a case in which there is a portion belonging to the predetermined color region in the original image, there is no unnatural finish in the output image, such as portions, in which the saturation adjustment amount suddenly changes, arising at the periphery of this portion.

Due to the operator visually confirming the output image which is displayed this time on the CRT 20, the operator verifies whether or not the image quality of the output image has been appropriately improved by the instructed saturation adjustment. Then, for example, if the operator judges that the saturation adjustment amount is inappropriate, the operator inputs, via the key correction input section 48, information for correcting the previously-instructed saturation adjustment amount. In this way, the determination in step 110 is negative and the determination in step 112 is affirmative, and the processings of steps 116 through 128 are repeated on the basis of the new saturation adjustment amount after correction.

Further, in the verification of the output image, for example, if it is judged that the saturation adjustment amount for the overall image is appropriate but that there are portions where the image quality has deteriorated because the change (increase) in saturation is excessive, the operator operates the key correction input section 48 in order to suppress the saturation change of these portions. The operator designates the color region, to which these portions belong, as a color region which is the object of saturation change suppression, and designates the degree of suppression of the saturation change for the designated color region.

For example, it is easy for an unnatural finish to arise if the saturation of portions corresponding to the green of trees or grass in the image is high. As a result, in a case in which it is judged that the finish of such portions in the image is unnatural, the operator designates the color region corresponding to green color (the color region centered around hue angle H*≈135°) as a color region which is an object of saturation change suppression.

In the present embodiment, in order to easily carry out designating of a color region which is an object of saturation change suppression, the hue angle H*, the saturation C* and the lightness L* in the output image are each divided into plural ranges (e.g., divided into three levels of high/medium/low, or divided into even finer divisions). In this way, the color reproduction range of the output image is divided in advance into a plurality of portion color regions. Due to the operator operating the key correction input section 48 and selecting, from the plurality of portion color regions, the color region at which the change in saturation is to be suppressed, the color region which is the object of saturation change suppression can be designated.

Note that the designation of the color region which is the object of saturation change suppression is not limited to the above-described method. For example, the designation may be carried out by the operator designating parameters such as the hue angle, the normalized saturation, the normalized lightness or the like, which prescribe the center or the outer edge of the color region which is the object of saturation change suppression. (For example, the operator may designate the color region which is the object of saturation change suppression as "color region centered around hue angle H*≈135°"or the like.)

With regard to the designation of the degree of suppression of change in saturation as well, in the present embodiment, the degree of suppression may be divided into plural levels (e.g., high/medium/low), and the operator may operate the key correction input section 48 so as to select a level corresponding to the desired degree of suppression from the plural levels. The degree of suppression of the saturation change may be designated in this way.

When the operator inputs the aforementioned information, the answer to the determination in step 124 is affirmative, and the routine moves on to step 126. In step 126, the saturation adjustment data currently set in the 3D-LUT 44 for saturation adjustment is read out, and the read-out saturation adjustment data is corrected so as to become a conversion characteristic which suppresses the saturation change, in the output image, of the designated color region in accordance with the designated degree of suppression. Thereafter, the routine moves on to step 128.

The correction of the saturation adjustment data can be realized by, for example, determining saturation adjustment data D" in accordance with the following formula on the basis of the saturation adjustment data D before correction which is currently set in the 3D-LUT 44 for saturation adjustment and the data D' (the data for setting in the 3D-LUT) which is set such that the saturation of all of the color regions does not change.

$$D''=K \cdot D'+(1-K) \cdot D$$

Figure 6:
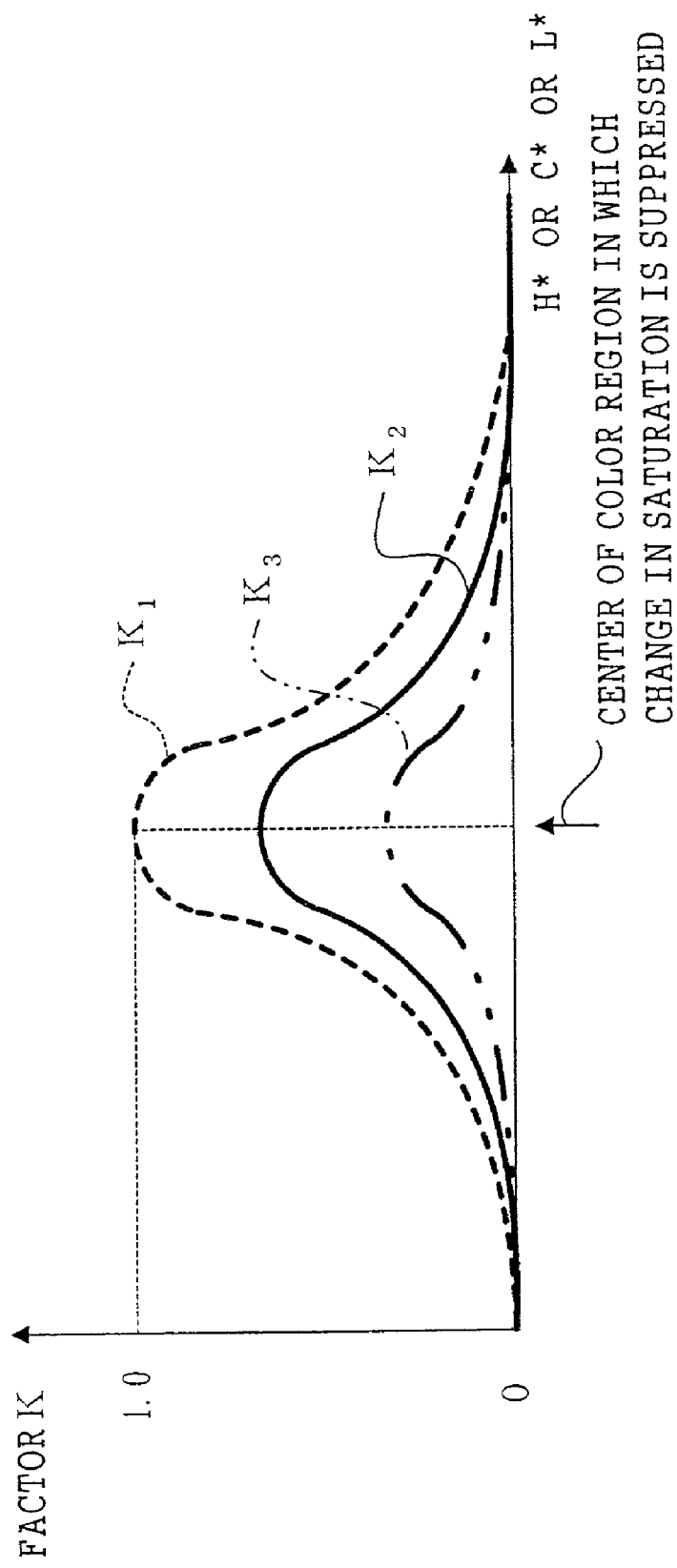
FIG. 6 is a graph showing an example of a relationship between a factor K used in correcting saturation adjustment data and a hue angle H* or saturation C* or lightness L*, in a case in which addition of a color region which is an object of saturation change suppression is instructed by an operator.

As shown as an example in FIG. 6, the factor K in the above formula is a factor which is determined for a change in the hue angle H* or the saturation C* or the lightness L* such that the value of K is zero at regions other than a vicinity of the color region designated by the operator, and the value of K is greater than zero in a vicinity of the designated color region. In the example of FIG. 6, plural types of factors $K_1$, $K_2$, $K_3$, whose values (peak values) in the designated color region are respectively different, are prepared, and $K_1$ through $K_3$ are selectively used in accordance with the degree of suppression of saturation change designated by the operator. In this way, the saturation adjustment data D set at the 3D-LUT 44 for saturation adjustment can be corrected to saturation adjustment data D" of a conversion characteristic which suppresses, in accordance with the designated degree of suppression, a change in saturation in the output image of the designated color region.

Above-described step 126 corresponds to the generating section recited in the twelfth aspect. Due to the above-described processes and due to the processings of steps 128, 106 and 108, an output image, in which the change in saturation is suppressed at a suppression rate designated by the operator, for the color region designated by the operator as well, is displayed on the CRT 20.

When the operator judges that the image quality of the output image displayed on the CRT 20 is appropriate and inputs, via the key correction input section 48 and as information expressing the results of verification, information meaning that the image quality is satisfactory ("verification OK"), the answer to the determination in step 110 is affirmative. The routine moves on to step 130 where information expressing the processing conditions which have been decided upon (the latest processing conditions relayed to the first image processing section 32) is temporarily stored in the storage portion 50 in correspondence with image identification information (e.g., the frame number) which identifies the object image (the image which has been verified by the operator).

In subsequent step 132, a determination is made as to whether saturation adjustment was instructed by the operator at the time of image verification. If the answer to this determination is negative, set-up processing is completed without any processings being carried out. However, in a case in which saturation adjustment was instructed by the operator at the time of image verification, the answer to the determination in step 132 is affirmative, and the routine moves on to step 134. In step 134, on the basis of the output form designating information which is attached to the low resolution image data stored in the prescan memory 28, the output form at the time of outputting the image by using the high resolution image data expressing the same image as that low resolution image data is determined, and it is judged whether or not the output form is "print output".

If the output form at the time of outputting the image by using high resolution image data is "print output", the color reproduction region of the output image (in this case, the output image recorded on photographic printing paper) is different than the color reproduction region of the output image displayed on the CRT 20 at the time of image verification. Thus, if saturation adjustment is carried out on the high resolution image data by using saturation adjustment data which is the same as at the time of image verification, there is the possibility that the output image displayed on the CRT 20 at the time of image verification will not be reproduced on photographic printing paper, and that oversaturation and other problems with image quality will arise in the output image recorded on the photographic printing paper.

Thus, in a case in which the determination in step 134 is affirmative, the routine moves on to step 136. In the same way as in previously-described steps 116 through 126, the saturation adjustment amount which was ultimately decided upon at the time of image verification is sensed. Among the saturation adjustment data for "print output" stored in the storage portion 50, the saturation adjustment data, whose corresponding saturation adjustment amount ΔC matches or is near to the saturation adjustment amount which has been sensed, is read out from the storage portion 50. If needed, interpolation computation is carried out so as to obtain saturation adjustment data whose corresponding saturation adjustment amount ΔC matches the sensed saturation adjustment amount.

Further, in a case in which a color region, at which a change in saturation should be suppressed, is designated by the operator at the time of image verification, the saturation adjustment data is corrected such that the change in saturation in the output image for the designated color region is suppressed at the degree of suppression designated by the operator. In this way, it is possible to obtain saturation adjustment data of a conversion characteristic which can convert high resolution image data such that the output image recorded on the photographic printing paper is of the same image quality as the output image displayed on the CRT 20 at the time of image verification. When the processing of step 136 is carried out, the routine moves on to step 138.

On the other hand, in a case in which the output form at the time of outputting the image by using the high resolution image data is "monitor display/CD-R writing", the color reproduction range of the output image is the same as that at the time of image verification. Saturation adjustment can be carried out on the high resolution image data by using the same saturation adjustment data as at the time of image verification. Thus, the routine moves on to step 138 without any processings being carried out. Note that above-described steps 134, 136 correspond to the converting section of the ninth and eleventh aspects and the generating section of the twelfth aspect, respectively.

In step 138, the saturation adjustment data for the high resolution image data which was decided upon by the above-described processings is temporarily stored in the storage portion 50 in correspondence with the processing condition information and the image identification information temporarily stored in the storage portion 50 in step 130. Further, in the next step 140, a determination is made as to whether the saturation adjustment data stored in step 138 is saturation adjustment data which has been corrected in accordance with a designation from the operator of a color region which is an object of saturation change suppression.

If the answer to the determination is negative, the set-up processing is completed. However, if the answer to the determination in step 140 is affirmative, the saturation adjustment data temporarily stored in the storage portion 50 in step 138 is registered in a saturation adjustment data registration region provided in the storage region of the storage portion 50 separately from the region for the aforementioned temporary storage. In this way, the saturation adjustment data temporarily stored in the storage portion 50 for saturation adjustment of a specific image can be used as well for saturation adjustment of another image.

After set-up processing has been completed, when the high resolution image data of the image which is to be outputted in the designated predetermined output form is outputted from the image data pre-processing section 26 and stored in the fine scan memory 30, the set-up computation section 34, on the basis of the image identification information of the image expressed by the high resolution image data stored in the fine scan memory 30, reads out from the storage portion 50 the processing condition information corresponding to the high resolution image data, outputs the read processing condition information to the second image processing section 36, and gives instructions that image processing is to be carried out.

Further, when the set-up computation section 34 reads out the processing condition information from the storage portion 50, in a case in which the saturation adjustment data is stored in correspondence with the image identification information and the processing condition information, the saturation adjustment data also is read out from the storage portion 50. The read-out saturation adjustment data is set in the 3D-LUT 44 for saturation adjustment, and the selector 42 is switched such that the image data inputted to the selector 42 is inputted to the 3D-LUT 44 for saturation adjustment. In a case in which no corresponding saturation adjustment data is stored in the storage portion 50, the selector 42 is switched such that the image data inputted to the selector 42 bypasses the 3D-LUT 44 for saturation adjustment and is inputted to the selector 46.

Further, the set-up computation section 34 senses the output form of the image, reads out from the storage portion 50 the density conversion data corresponding to the sensed output form, sets the density conversion data in the LUT 40 for density conversion, and switches the selector 46 such that the image data inputted to the selector 46 is outputted to an output device corresponding to the sensed output form (the laser printer 22 or the CD-R writing device 24).

In this way, at the second image processing section 36, the high resolution image data is read out from the fine scan memory 30, and various types of image processings are carried out in accordance with the processing conditions expressed by the processing condition information inputted from the set-up computation section 34. Thereafter, the high resolution image data is outputted to the color reproduction conversion section 38.

The high resolution image data which has been inputted to the color reproduction conversion section 38 from the second image processing section 36 is inputted to the LUT 40 for density conversion. On the basis of the density conversion data set in the LUT 40 for density conversion by the set-up computation section 34, density conversion is carried out. In a case in which saturation adjustment data is set in the 3D-LUT 44 for saturation adjustment by the set-up computation section 34, the high resolution image data for which density conversion has been carried out is inputted to the 3D-LUT 44 for saturation adjustment, and saturation adjustment processing is carried out on the basis of the saturation adjustment data.

Then, the image data, which has been subjected to color reproduction conversion processing by the color reproduction conversion section 38, is outputted, via the selector 46, to an output device corresponding to a predetermined output form, and is recorded as an image onto photographic printing paper by the laser printer 22 or is written onto a CD-R by the CD-R writing device 24.

In this way, for the image for which saturation adjustment is instructed at the time of image verification, saturation conversion processing is carried out by the 3D-LUT 44 for saturation adjustment on the basis of the saturation adjustment data set by the set-up computation section 34. (If the output form is "monitor display/CD-R writing", processing is carried out on the basis of the same saturation adjustment data as the saturation adjustment data used at the time of image verification. If the output form is "print output", processing is carried out on the basis of saturation adjustment data whose saturation adjustment amount and color region which is the object of saturation change suppression are the same as those of the saturation adjustment data used at the time of image verification.)

Accordingly, for an output image outputted by using high resolution image data (an image recorded on a photographic printing paper or an image displayed on a CRT by using image data recorded on a CD-R), the overall saturation is changed in accordance with instructions from the operator, a change in saturation of portions corresponding to the skin of persons is suppressed, and coloring of neutral color portions in the image, oversaturation of high saturation portions in the image, and a great change in saturation at the highlight portions and shadow portions can be prevented. Further, there is no unnatural finish due to portions arising in which the saturation adjustment amount in the output image suddenly changes.

In the above description, saturation adjustment data are set and stored separately for each of the image output forms of "monitor display/CD-R writing" and "print output". However, the present invention is not limited to the same. For example, it is possible to set and store only the saturation adjustment data corresponding to a specific output form (e.g., "monitor display/CD-R writing"), and to set and store conversion data for converting the saturation adjustment data corresponding to the specific output form into saturation adjustment data corresponding to another output form. In a case in which an image is to be outputted in an output form (e.g., "print output") other than the specific output form, the stored saturation adjustment data is converted by the conversion data, such that saturation adjustment data corresponding to the output form of the image is acquired.

Figure 7:
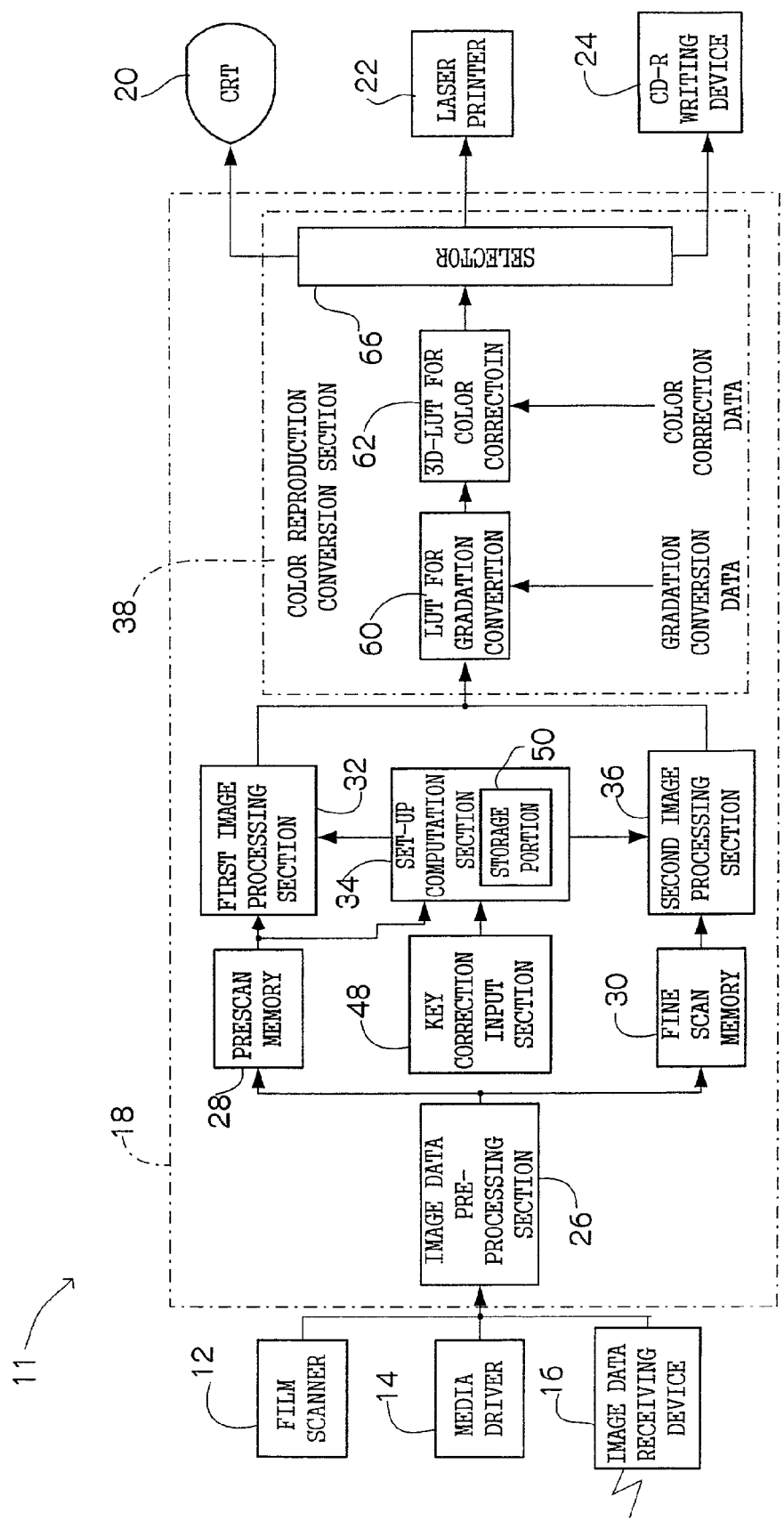
FIG. 7 is a block diagram showing a schematic structure of an image processing system relating to the embodiment of the present invention.

Next, a second embodiment of the present invention will be described with reference to FIGS. 7 through 11. In FIG. 7, portions which are the same as those of the image processing system 10 relating to the first embodiment of the present invention are denoted by the same reference numerals, and description thereof is omitted.

In an image processing system 11 of FIG. 7, the color reproduction conversion section 38 is formed by a look-up table (LUT) 60 for gradation conversion for converting the gradation of inputted image data, a three-dimensional look-up table (3D-LUT) 62 for color correction for correcting a change in image quality accompanying a change in gradation at the LUT 60 for gradation conversion, and a selector 64 being connected in that order, such that the image expressed by the inputted image data is appropriately reproduced in the output image (the image which is made visible on a photographic printing paper in the output form of recording images onto a photographic printing paper, or an image displayed on the CRT 20 by using recorded image data in the output form of recording image data on a CD-R). The CRT 20, the laser printer 22 and the CD-R writing device 24 are connected to the output ends of the selector 64.

The LUT 60 for gradation conversion corresponds to the converting section of the present invention. The 3D-LUT 62 for color correction and the set-up computation section 34, which sets the color correction data (to be described in detail later) in the 3D-LUT 62 for color correction, correspond to the control section of the present invention.

Figure 8:
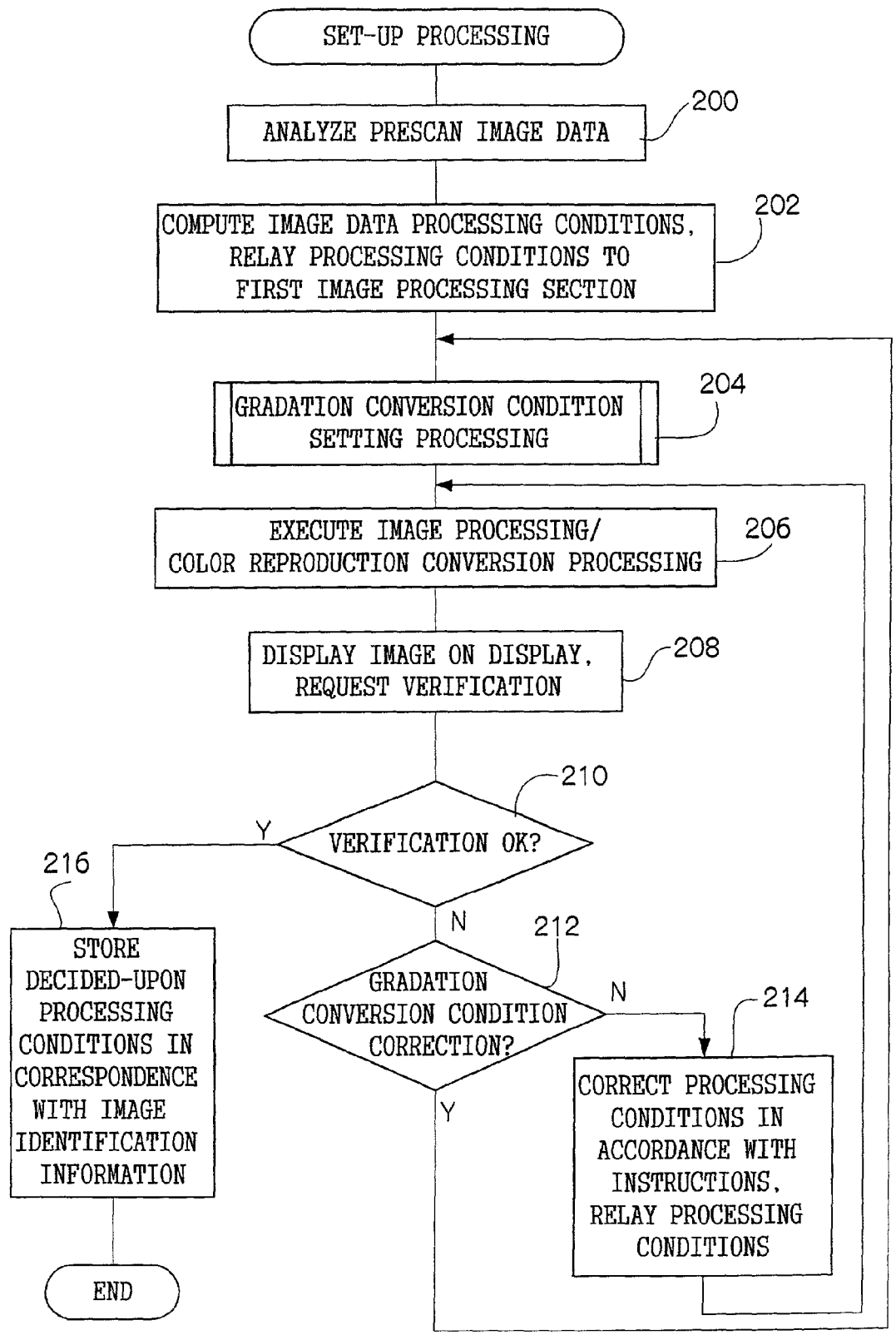
FIG. 8 is a flowchart showing the contents of set-up computation processing carried out at the set-up computation section.
Figure 9A:
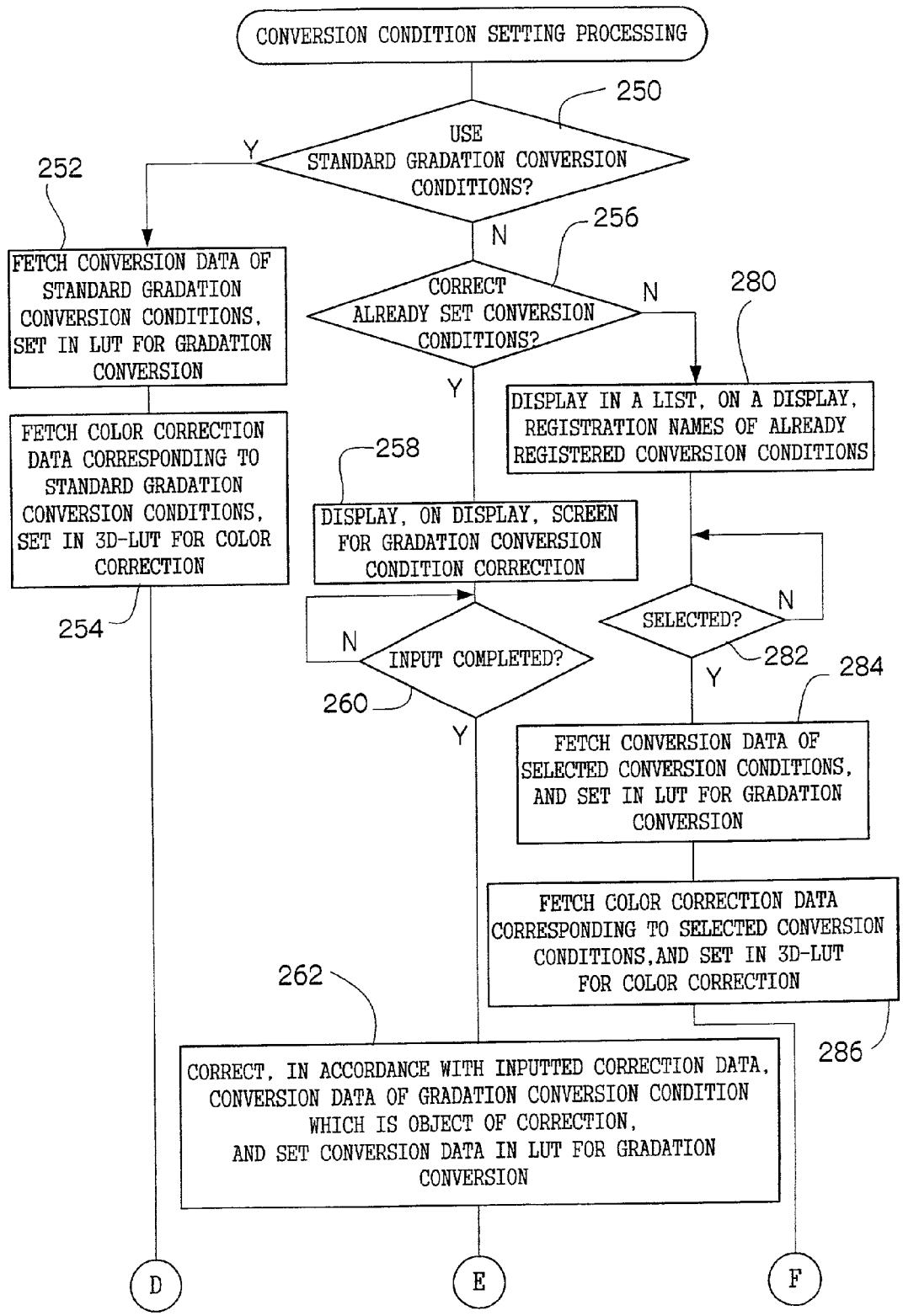
FIG. 9A is a flowchart showing the contents of conversion condition setting processing.
Figure 9B:
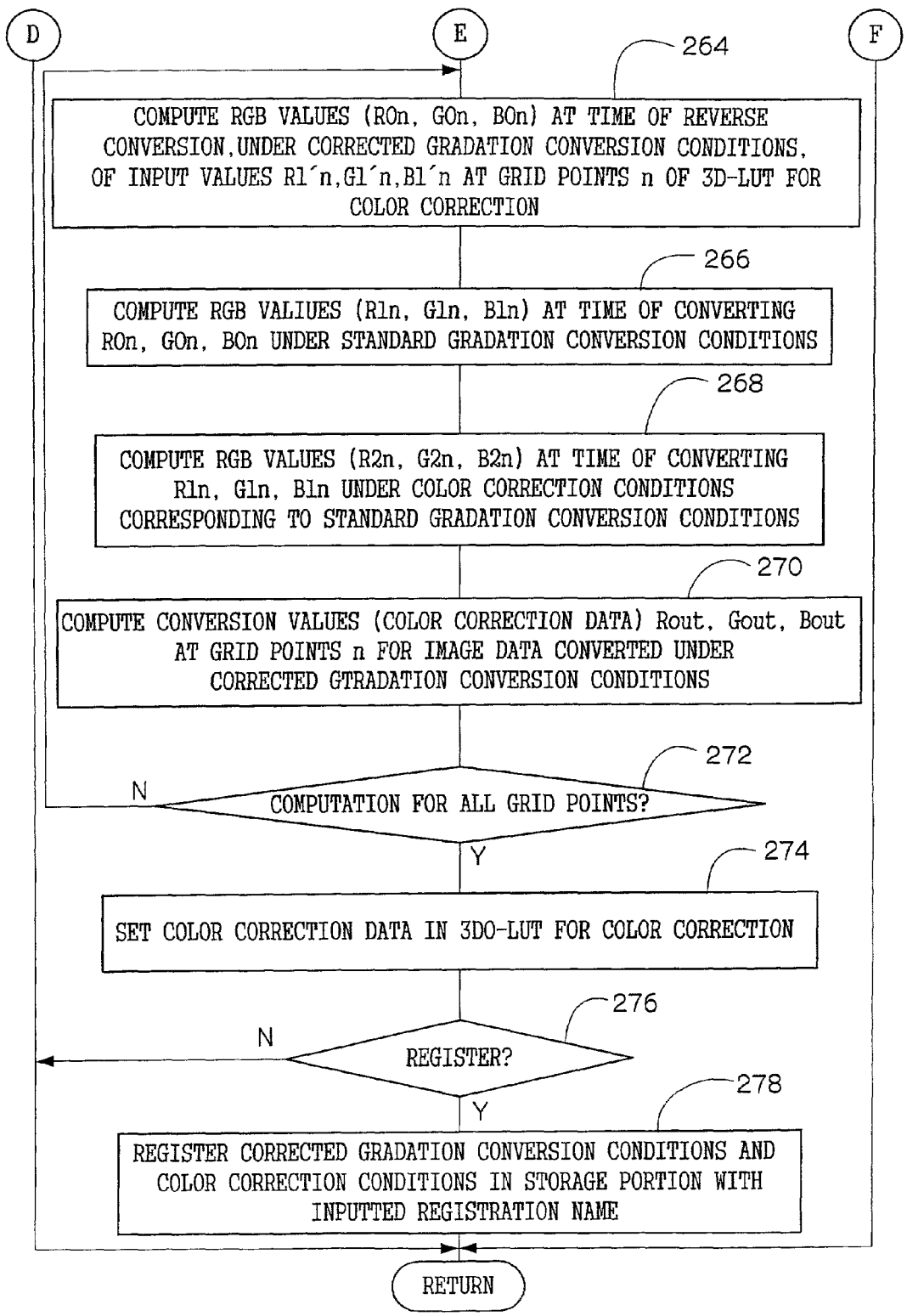
FIG. 9B is a flowchart showing the contents of conversion condition setting processing.

Next, operation of the present embodiment will be described with reference to the flowchart in FIG. 8 which shows the set-up processing executed at the CPU of the set-up computation section 34. This set-up processing is executed by (the CPU of) the set-up computation section 34 each time the low resolution image data of a single image is stored in the prescan memory 28.

In step 200, the low resolution image data stored in the prescan memory 28 is fetched, and image data analysis including processings such extraction of the main portions in the image (e.g., the regions corresponding to the faces of persons (face regions)), computation of various types of image characteristic amounts, and the like, is carried out. In step 202, on the basis of the results of analysis of the image data in step 200, the optimal processing conditions for the image processing to be carried out at the second image processing section 36 on the high resolution image data are computed, and the first image processing section 32 is informed of these computed processing conditions.

In the following step 204, gradation conversion data for carrying out gradation conversion is set in the LUT 60 for gradation conversion, and gradation conversion condition setting processing, which sets, in the 3D-LUT 62 for color correction, the color correction data for carrying out color correction, is carried out. This gradation conversion condition setting processing will be described with reference to the flowchart of FIGS. 9A and 9B.

In the present embodiment, at least gradation conversion data, which expresses standard gradation conversion conditions, is stored in advance in the storage portion 50 (which is formed by an HDD) of the set-up computation section 34 as gradation conversion data for setting in the LUT 60 for gradation conversion. When the gradation of the image data is to be converted, the saturation and the hue of the image expressed by the image data are converted. Thus, in the present embodiment, when image output is carried out by using, as the color correction data for setting in the 3D-LUT 62 for color correction, at least image data which converts the gradation under standard gradation conditions, color correction data, which expresses color correction conditions (a color conversion characteristic) determined such that the saturation and the hue in the output image are reproduced as an appropriate image, is stored in the storage portion 50 in correspondence with the gradation conversion data expressing the standard gradation conversion conditions. Note that the storage portion 50 corresponds to the first storing section and the second storing section of the present invention.

For example, the gradation of the image data expressing a known Macbeth chart may be converted in accordance with standard gradation conversion conditions, and by using the image data which has been subjected to gradation conversion, the image (Macbeth chart) can be exposed and recorded onto a photographic printing paper by the laser printer 22, and the saturation and hue can be evaluated for each patch of the Macbeth chart formed on the photographing printing paper. The color correction conditions (color conversion characteristic) expressed by the color correction data can be determined such that the saturation and hue of each patch are appropriate. A Macbeth chart is formed to include, as colors to be imaged (subject colors), a good balance of patches of various colors which appear frequently (e.g., a plurality of gray patches having respectively different lightnesses, or R, G, B, C, M, Y patches, or patches of colors such as DarkSkin, LightSkin, BlueSky, Foliage, and the like). The image quality of an image can be appropriately evaluated by using a small number of patches.

The following three output forms are prepared as the image output forms in the present embodiment: displaying the image onto the CRT 20 (monitor display), recording the image onto a photographic printing paper by the laser printer 22 (printer output), and writing the image data onto a CD-R by the CD-R writing device 24 (CD-R writing). However, among these, monitor display is for advance verification of the image quality of an image to be outputted by printing, and a monitor display image requires the same level of image quality as a print output image.

Because the image data written onto a CD-R is usually used in display on a CRT monitor, when displaying the image data on the CRT monitor, it is preferable to display the image data on the CRT monitor at a preferable image quality without subjecting the image data to any particular post-processings. As a result, in the present embodiment, color correction data for monitor display and CD-R writing, and color correction data for print output are determined separately as color correction data corresponding to the standard gradation conversion conditions. At the time of monitor display or CD-R writing, color space conversion is included in order to make the image quality of the output image the same level as that of print output. Then, at the time of setting the color correction data into the 3D-LUT 62 for color correction, the color correction data corresponding to the output form is set in the 3D-LUT 62 for color correction.

Further, in order to reduce the data amount of the conversion data to be stored in the 3D-LUT, usually, only the conversion data corresponding to the peaks (grid points) of respective grid portions, when the data space of the data which is to be converted is divided into a large number of grid portions, is stored. When data corresponding to an area between grid points is inputted, the corresponding conversion data is determined by interpolation computation from the conversion data of the surrounding grid points and is outputted. As a result, in the present embodiment, only the conversion data corresponding to the grid points is set as color correction data.

In step 250 of the gradation conversion condition setting processing, by displaying a predetermined message on the CRT 20 or the like, the operator is asked whether or not gradation conversion is to be carried out by using standard gradation conversion conditions. On the basis of information which the operator inputs via the key correction input section 48 in response to this query, a determination is made as to whether gradation conversion is to be carried out by using the standard gradation conversion conditions. First, due to the standard gradation conversion conditions being selected by the operator, the answer to the determination in step 250 is affirmative, and the routine moves on to step 252. In step 252, the gradation conversion data expressing the standard gradation conversion conditions is fetched from the storage portion 50, and the fetched gradation conversion data are set in the LUT 60 for gradation conversion.

In next step 254, the color correction data, which is stored is correspondence with the gradation conversion data expressing the standard gradation conversion conditions, is read from the storage portion 50, and is set in the 3D-LUT 62 for color correction. In this way, gradation conversion can be carried out under the standard gradation conversion conditions on the image data inputted to the color reproduction conversion section 38, without there being a change in image quality such as a change in saturation or hue or the like. Then, the selector 66 is switched such that the image data inputted to the selector 66 from the 3D-LUT 62 for color correction is outputted to the CRT 20, and the routine moves on to step 206 of the set-up processing (FIG. 8).

In step 206, the low resolution image data stored in the prescan memory 28 is subjected to various types of image processings by the first image processing section 32, and is subjected to color reproduction conversion processing by the color reproduction conversion section 38 (gradation conversion processing by the LUT 60 for gradation conversion and color correction processing by the 3D-LUT 62 for color correction).

In this way, the first image processing section 32 fetches the low resolution image data from the prescan memory 28. On the basis of the processing conditions notified by the processing of step 202, the first image processing section 32 subjects the low resolution image data to image processings, which are equivalent to image processings carried out by the second image processing section 36 on the high resolution image data, so as to generate simulation image data. The simulation image data generated by the first image processing section 32 is subjected to color reproduction conversion processings by the LUT 60 for gradation conversion and the 3D-LUT 62 for color correction of the color reproduction conversion section 38.

In step 208, the image data which has been subjected to color reproduction conversion processing by the color reproduction conversion section 38 is outputted to the CRT 20. An image expressed by the image data is thereby displayed on the CRT 20 as an output image. A message requesting that the operator verify the output image displayed on the CRT 20 is also displayed on the CRT 20, so that the operator is made to verify the finish and the like of the respective portions of the output image displayed on the CRT 20.

When the output image is displayed on the CRT 20 and verification of the output image is requested, the operator visually confirms the output image displayed on the CRT 20, and verifies whether or not the image quality of the output image is appropriate, i.e., whether the processing conditions computed at the set-up computation section 34 are appropriate, and whether the gradation expression of the output image is appropriate. The operator inputs information expressing the results of verification via the key correction input section 48.

When the operator inputs information expressing the results of verification via the key correction input section 48, the routine moves on to step 210 where it is judged whether the information expressing the results of verification which the operator inputted via the key correction input section 48 is information meaning that the image has been verified to be satisfactory ("verification OK"). In a case in which information meaning "verification OK" has been inputted, the answer to the above determination is affirmative, and the routine moves on to step 216. However, in a case in which information instructing correction of the image processing conditions or information instructing correction of the gradation conversion conditions is inputted as the information expressing the results of verification, it is judged that the results of verification by the operator are that the image is unsatisfactory ("verification NG (no good)"), and the routine moves on to step 212.

In step 212, it is judged whether the information expressing the inputted results of verification is information instructing correction of the gradation conversion conditions. In a case in which information instructing correction of the image processing conditions has been inputted, the determination in step 212 is negative, and the routine moves on to step 214. In step 214, the image processing conditions computed in previous step 202 are corrected in accordance with the inputted instructions, and the first image processing section 32 is informed of the corrected processing conditions. Thereafter, the routine returns to step 206.

In this way, at the first image processing section 32, processing for regenerating the simulation image data is carried out in accordance with the corrected processing conditions, and the regenerated simulation image data is subjected to color reproduction conversion processing at the color reproduction conversion section 38, and then outputted to the CRT 20. In this way, an output image is displayed on the CRT 20 on the basis of the processing conditions which have been corrected in accordance with the inputted correction instructions. Due to the operator visually confirming the output image displayed on the CRT 20 this time, the operator can easily judge whether or not the contents of the inputted correction instructions are appropriate.

On the other hand, in a case in which it is determined that the gradation expression of the output image displayed on the CRT 20 is inappropriate, the operator inputs, via the key correction input section 48, information instructing use of gradation conversion conditions other than the standard gradation conversion conditions. In this case, the determination in step 212 is affirmative, and the routine returns to step 204, and gradation conversion condition setting processing (FIGS. 9A and 9B) is again carried out.

In the gradation conversion condition setting processing, due to information instructing the use of gradation conversion conditions other than the standard gradation conversion conditions being inputted, the determination in step 250 is negative, and the routine moves on to step 256. In step 256, by displaying a predetermined message on the CRT 20 or the like, the operator is asked whether gradation conversion conditions obtained by correcting the gradation conversion conditions which are currently set should be used in gradation conversion. The processing diverges on the basis of the information which the operator has inputted through the key correction input section 48 in response to this query. In a case in which correction of the gradation conversion conditions which are currently set is instructed, the routine moves from step 256 to step 258 where a gradation conversion condition correction screen, which allows the operator to instruct correction of the gradation conversion conditions, is displayed on the CRT 20.

As an example, as shown in FIG. 10, the gradation conversion condition correction screen is provided with the buttons "hard gradation enhancement", "no correction", "soft gradation enhancement" for respective density regions obtained by dividing the entire density range of the image, from highlight to shadow, into three density regions (highlight region, intermediate gradation region, and shadow region). By the operator operating a mouse or the like of the key correction input section 48 and clicking on a desired button, it is possible to arbitrarily instruct, for each density region, correction of the slope ($\gamma$) of the gradation conversion conditions. (The entire density region may be divided into more regions or fewer regions than the aforementioned three regions. Further, a single slope may be set for the entire density region.) In next step 260, it is judged whether input of information for correcting the gradation conversion conditions has been completed, and the routine waits until input is completed.

In this way, by the operator operating the key correction input section 48, the gradation conversion conditions which are currently set can be arbitrarily corrected such that optimal gradation conversion conditions corresponding to the type of the photographed subject existing in the image or the application of the image (i.e., desired gradation conversion conditions) can be obtained. When the operator completes input of information for correcting the gradation conversion conditions, the answer to the determination in step 260 is affirmative. The routine moves on to step 262 where the conversion data expressing the gradation conversion conditions which are the object of correction (the gradation conversion conditions which are currently set) are corrected in accordance with the instructions for correction inputted by the operator.

Figure 11A:
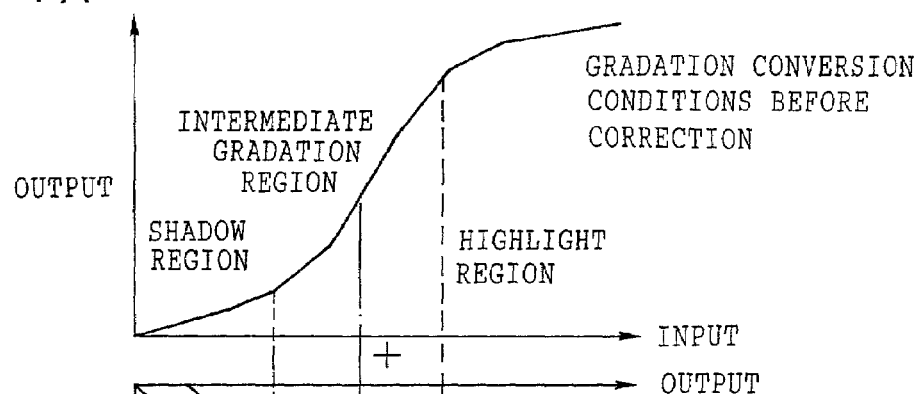
FIG. 11A is a graph for explaining correction of gradation conversion conditions.
Figure 11B:
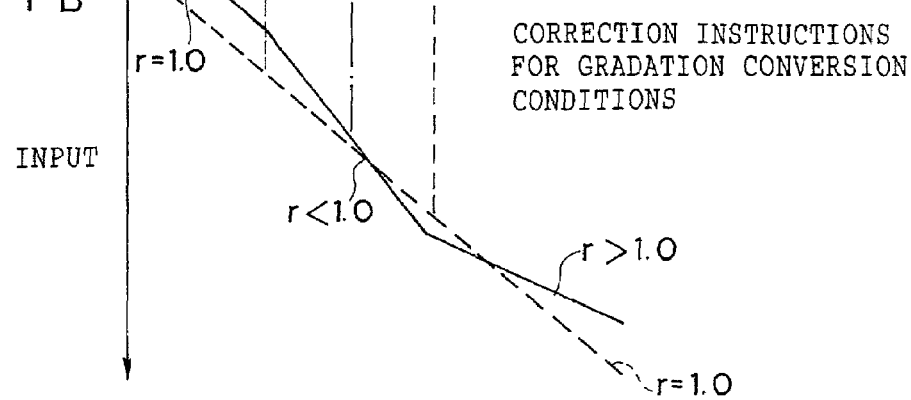
FIG. 11B is a graph for explaining correction of gradation conversion conditions.
Figure 11C:
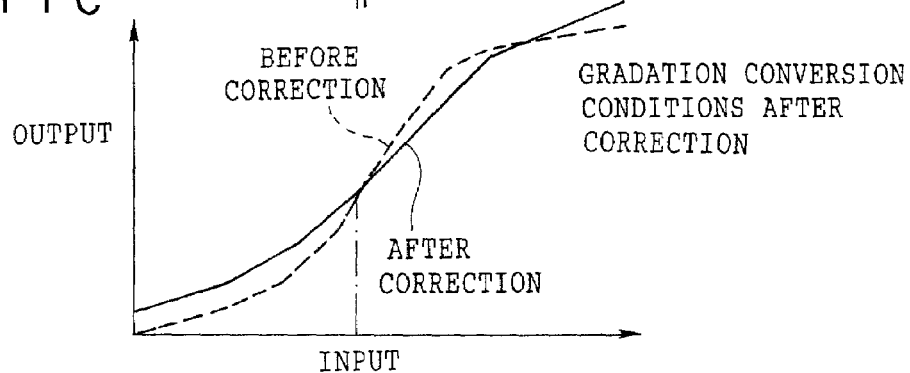
FIG. 11C is a graph for explaining correction of gradation conversion conditions.

For example, gradation conversion conditions such as shown in FIG. 11A are set as the gradation conversion conditions. In a case in which, for example, as shown in FIG. 11B, "hard gradation enhancement" is selected for the highlight region, "soft gradation enhancement" is set for the intermediate gradation region, and "no correction" is selected for the shadow region, the correction of the gradation conversion conditions can be carried out by superposing (cascading) the gradation conversion conditions currently set and the gradation conversion conditions stipulated by the inputted correction instruction. In this way, conversion data expressing the gradation conversion conditions shown by the solid line in FIG. 11C can be obtained.

Then, when the gradation conversion data, which express the gradation conversion conditions desired by the operator, are obtained as described above, the obtained gradation conversion data is set in the LUT 60 for gradation conversion. In this way, gradation conversion is carried out, by the LUT 60 for gradation conversion and under the gradation conversion conditions desired by the operator, on the image data inputted to the color reproduction conversion section 38.

In steps from step 264 on, color correction conditions, which correct changes in saturation or hue or the like at the time that gradation conversion is carried out by using the corrected gradation conversion conditions, are computed as color correction conditions corresponding to the corrected gradation conversion conditions. Namely, in step 264, RGB values (R0$n$, G0$n$, B0$n$) at the time of converting back, under the corrected gradation conversion conditions, the input values R1'$n$, G1'$n$, B1'$n$ (the input values at the respective grid points are fixedly determined) at specific grid points (wherein n is the grid point) of the 3D-LUT 62 for color correction, are computed.

In subsequent step 266, the RGB values R1$n$, G1$n$, B1$n$ at the time of converting the RGB values R0$n$, G0$n$, B0$n$ under the standard gradation conversion conditions are computed. In step 268, RGB values (R2$n$, G2$n$, B2$n$) at the time of correcting (converting) the RGB values R1$n$, G1$n$, B1$n$ at color correction conditions corresponding to the standard gradation conversion conditions, are computed. In step 270, the color correction data Rout, Gout, Bout (=R2'$n$, G2'$n$, B2'$n$) expressing the color conversion conditions at grid point n, among the color correction conditions corresponding to the corrected gradation conversion conditions, are computed in accordance with the following formulas.

$$Rout = R2'n$$
$$= R2n - (R2n + G2n + B2n)/3 + (R2'n + G2'n + B2'n)/3$$
$$Gout = G2'n$$
$$= G2n - (R2n + G2n + B2n)/3 + (R2'n + G2'n + B2'n)/3$$
$$Bout = B2'n$$
$$= B2n - (R2n + G2n + B2n)/3 + (R2'n + G2'n + B2'n)/3$$

In the next step 272, a determination is made as to whether the computations of steps 264 through 270 have been carried out for all of the grid points of the 3D-LUT 62 for color correction. When the determination is negative, the routine returns to step 264, and steps 264 through 272 are repeated.

The RGB values R2$n$, G2$n$, B2$n$ determined in step 268 are RGB values in a case in which the RGB values (image data) R0$n$, G0$n$, B0$n$ are converted in accordance with the standard gradation conversion conditions, and are again corrected (converted) in accordance with color correction conditions corresponding to the standard gradation conversion conditions. On the other hand, the RGB values R2'$n$, G2'$n$, B2'$n$ which satisfy the above formulas and the RGB values R2'$n$, G2'$n$, B2'$n$ have the same ratio of the difference, for each of RGB, to the RGB value (which is (R2'$n$+G2'$n$+B2'$n$)/3) of a pixel whose hue is gray and whose lightness is substantially the same as that of a pixel whose RGB values are R2'$n$, G2'$n$, B2'$n$, with respect to those of the RGB values R2$n$, G2$n$, B2$n$. Thus, pixels whose RGB values=R2'$n$, G2'$n$, B2'$n$ are visually recognized as pixels having the same saturation and hue as pixels whose RGB values=R2$n$, G2$n$, B2$n$.

As a result, as described above, the color correction data of the respective grid points of the 3D-LUT 62 for color correction are set such that the RGB values R1'$n$, G1'$n$, B1'$n$ at the time of converting the RGB values (image data) R0$n$, G0$n$, B0$n$ in accordance with the corrected gradation conversion conditions are converted to the RGB values R2'$n$, G2'$n$, B2'$n$ (=Rout, Gout, Bout) by the color correction. In this way, color correction conditions (color correction data), which can correct the changes in the saturation, hue or the like at the time that gradation conversion is carried out by using corrected gradation conversion conditions, can be obtained.

When the color correction data is set for all of the grid points, the answer to the determination in step 272 is affirmative, and the routine moves on to step 274 where the obtained color correction data is set in the 3D-LUT 60 for color correction. In this way, gradation conversion can be carried out on the image data inputted to the color reproduction conversion section 38 under the gradation conversion conditions desired by the operator, without changes in image quality, such as changes in the saturation or hue or the like, arising.

As described above, there are two types of color correction data corresponding to standard gradation conversion conditions: color correction data for monitor display and CD-R writing, and color correction data for print output. Thus, the processings of above-described steps 264 through 272 are carried out respectively by using the two types of color correction data. In step 274, among the two types of color correction data corresponding to the corrected gradation conversion conditions, the color correction data for monitor display and CD-R writing are set in the 3D-LUT 60 for color correction.

In next step 276, by displaying a predetermined message on the CRT 20 or the like, the operator is asked whether or not the corrected gradation conversion conditions and the color correction conditions corresponding to these gradation conversion conditions are to be registered in the storage portion 50. On the basis of information which the operator inputs via the key correction input section 46 in response to this query, a determination is made as to whether the corrected gradation conversion conditions and the corresponding color correction conditions are to be registered in the storage portion 50.

When the answer to the determination is negative, the conversion condition setting processing ends without any processings being carried out. When the answer to the determination is affirmative, the routine moves on to step 278. In step 278, the gradation conversion data expressing the corrected gradation conversion conditions and the color correction data expressing the corresponding color correction conditions are registered in the storage portion 50 in correspondence with a registration name which the operator inputs via the key correction input section 48. Thereafter, the conversion condition setting processing ends, and the routine moves on to step 206 of the set-up processing (see FIG. 8). In this way, the gradation conversion conditions which have been newly set this time and the corresponding color correction conditions are registered in the storage portion 50, and can thereby be used in gradation conversion and color correction of the image data of other images as will be described later.

Further, in a case in which instructions are given that gradation conversion conditions which have already been registered in the storage portion 50 are to be used as the gradation conversion conditions other than the standard gradation conversion conditions, the determinations in step 250 and step 256 are both negative, and the routine moves on to step 280. In step 280, the registration names of all of the gradation conversion conditions which have already been registered in the storage portion 50 are displayed in a list on the CRT 20, and a predetermined message is displayed on the CRT 20 asking the operator to select one of the gradation conversion conditions from among the gradation conversion conditions whose registration names are displayed. In the next step 282, a determination is made as to whether any of the gradation conversion conditions have been selected, and the routine stands by until the answer to this determination is affirmative.

When the operator, in accordance with the message displayed on the CRT, selects, via the key correction input section 48, a registration name corresponding to the desired gradation conversion conditions from among the registration names which are displayed in a list on the CRT 20, the determination in step 282 is affirmative, and the routine moves on to step 284. In step 284, the gradation conversion data of the gradation conversion conditions which correspond to the selected registration name are fetched from the storage portion 50, and the fetched gradation conversion data is set in the LUT 50 for gradation conversion. In step 286, the color correction data of the color correction conditions corresponding to the gradation conversion conditions are fetched from the storage portion 50, and are set in the 3D-LUT 62 for color correction. Thereafter, the conversion condition setting processing ends, and the routine moves on to step 206 of the set-up processing (see FIG. 8).

In this way, gradation conversion can be carried out on the image data inputted to the color reproduction conversion section 38 under the gradation conversion conditions desired by the operator, without changes in image quality, such as changes in the saturation or hue or the like, arising.

Further, in step 206 of the set-up processing, the first image processing section 32 regenerates simulation image data. Further, the regenerated simulation image data is subjected to color reproduction conversion processing at the color reproduction conversion section 38 (gradation conversion is carried out in accordance with gradation conversion conditions other than the standard gradation conversion conditions, and color correction is carried out in accordance with the color correction conditions which are set such that changes in image quality, such as changes in saturation or hue or the like, do not arise). The data is then outputted to the CRT 20, and the output image is thereby displayed again on the CRT 20. By operator visually confirming the gradation expression of the output image which is displayed on the CRT 20, the operator can easily judge whether or not the current gradation conversion conditions are appropriate.

When the operator judges whether the image quality of the output image displayed on the CRT 20 is appropriate, and inputs, via the key correction input section 48 and as information expressing the results of verification, information meaning "verification OK", the answer to the determination in step 210 is affirmative. The routine moves on to step 216 where the decided-upon processing conditions (the latest processing conditions relayed to the first image processing section 32), the gradation conversion conditions (gradation conversion data) set in the LUT 60 for gradation conversion, and, among the two types of color correction data corresponding to these gradation conversion conditions, the color correction data corresponding to the output form of the image (the color correction data for print output in the case in which the output form is print output, and the color correction data for monitor display and CD-R writing in a case in which the output form is monitor display or CD-R writing) are temporarily stored in the storage portion 50 in correspondence with image identification information (e.g., the frame number) which identifies the object image (the image which is verified by the operator). The set-up processing then ends.

After set-up processing has been completed, when the high resolution image data of the image which is to be outputted in the designated, predetermined output form is outputted from the image data pre-processing section 26 and stored in the fine scan memory 30, on the basis of the image identification information of the image expressed by the high resolution image data stored in the fine scan memory 30, the set-up processing section 34 reads from the storage portion 50 the processing condition information corresponding to the high resolution image data, and outputs the read processing condition information to the second image processing section 36, and gives instructions that image processing is to be carried out.

Further, when the set-up computation section 34 reads the processing condition information from the storage portion 50, the set-up computation section 34 also reads out from the storage portion 50 the gradation conversion data and the color correction data (color correction data corresponding to the output form of the image) which are stored in correspondence with the image identification information and the processing condition information. The set-up processing section 34 sets the read-out gradation conversion data in the LUT 60 for gradation conversion, and sets the read-out color correction data in the 3D-LUT 62 for color correction, and switches the selector 66 such that the image data inputted to the selector 66 is outputted to the output device (the laser printer 22 or the CD-R writing device 24) corresponding to the output form of the image.

In this way, at the second image processing section 36, the high resolution image data is read-out from the fine scan memory 30, and after being subjected to various types of image processings in accordance with the processing conditions expressed by the processing condition information inputted from the set-up computation section 34, is outputted to the color reproduction conversion section 38.

The high resolution image data inputted to the color reproduction conversion section 38 from the second image processing section 36 is subjected to gradation conversion by the LUT 60 for gradation conversion in accordance with the gradation conversion data set in the LUT 60 for gradation conversion, and is subjected to color correction by the 3D-LUT 62 for color correction in accordance with the color correction data set in the 3D-LUT 62 for color correction. Thereafter, the data is outputted to an output device corresponding to the predetermined output form, and is either recorded as an image onto photographic printing paper by the laser printer 22 or written onto a CD-R by the CD-R writing device 24.

In this way, for output images which are outputted by using high resolution image data (images recorded onto photographic printing paper or images displayed on a CRT by using image data recorded on a CD-R), the gradation can be converted in accordance with instructions of the operator, and changes in image quality, such as changes in saturation or hue or the like, can be prevented from arising.

Note that, in the above description, gradation conversion is carried out by using a one-dimensional LUT. However, the present invention is not limited to the same. For example, a 3D-LUT may be provided as the LUT for gradation conversion, and gradation conversion may be carried out independently for each of the color components (e.g., R, G, B).

Further, in the above description, gradation conversion is carried out by the LUT 60 for gradation conversion, and color correction is carried out by the 3D-LUT 62 for color correction. However, the present invention is not limited to the same. Conversion data, which expresses a conversion characteristic in which are superposed gradation conversion conditions stipulated by gradation conversion data and color correction conditions stipulated by color correction data, maybe set in a single 3D-LUT, and gradation conversion and color conversion may be carried out simultaneously by converting the image data by this single 3D-LUT.

Further, in the above-described example of carrying out gradation conversion and color correction simultaneously by using a single 3D-LUT, conversion data, which carries out gradation conversion in accordance with a designated color conversion characteristic, may be set for only pixels, among the inputted image data, whose hues are gray or near gray. In this way, it is possible to realize color conversion by an arbitrary gradation conversion characteristic without changes in saturation or hue arising.

Further, the correction of the change in the ratio of the difference of each color component with respect to the gray of each pixel in the image data is not limited to being carried out by converting the image data by using a multidimensional look-up table as described above. For example, the above-described correction (reconversion of the image data) can be carried out by substituting values of the respective color components of the respective pixels of the image data into a conversion formula which expresses a desired conversion characteristic by a function or the like.

As described above, in the inventions of the first through fourteenth aspects, conversion data of a conversion characteristic, which changes, in units of respective pixels and by a predetermined amount, the saturation, in a visible image, of image data used in outputting a visible image, is stored. When the image data is converted in accordance with the stored conversion data, the conversion data is of a conversion characteristic that suppresses the change in saturation in the visible image, for pixels belonging to a predetermined color region. Thus, there is the excellent effect that the saturation of the image can be adjusted without leading to a deterioration in image quality.

In the second aspect of the present invention, in the invention of the first aspect, the predetermined color region is a region in which the hue angle in the visible image falls within a predetermined range. Thus, in addition to the above-described effect, there is the effect that a change in saturation of pixels which become a specific hue in the visible image can be suppressed.

In the third aspect of the present invention, in the invention of the second aspect, the predetermined range is a range corresponding to skin color. Thus, in addition to the above-described effects, there are the effects that a change in the saturation of portions, in the visible image, corresponding to the skin of persons can be suppressed, and a deterioration in image quality at portions which deterioration accompanies the change in saturation of the visible image can be effectively suppressed.

In the fourth aspect of the present invention, in the invention of the first aspect, the predetermined color region includes at least one of a low saturation region in which the saturation in the visible image is low and a high saturation region in which the saturation in the visible image is high. Thus, in addition to the above-described effect, there is the effect that, even in a case in which the saturation of the visible image is greatly raised or the like, a deterioration in image quality at at least one of the low saturation portion and the high saturation portion in the visible image can be prevented.

In the fifth aspect of the present invention, in the invention of the first aspect, the predetermined color region includes at least one of a high lightness region in which the lightness in the visible image is high and a low lightness region in which the lightness in the visible image is low. Thus, in addition to the above-described effect, there is the effect that, even in a case in which the saturation of the visible image is greatly raised or the like, a deterioration in image quality at at least one of the low lightness portion and the high lightness portion in the visible image can be prevented.

In the sixth aspect of the present invention, in the invention of any of the first through fifth aspects, the conversion characteristic of the conversion data is set such that, the closer to the predetermined color region, the greater the degree of suppression of a change in saturation in the visible image for pixels positioned within the predetermined region in a vicinity of the border. Thus, in addition to the above-described effects, there is the effect that the finish in a vicinity of the outer edge of a portion corresponding to the predetermined color region in the visible image can be prevented from being unnatural.

In the eighth aspect of the present invention, in the invention of the first aspect, the conversion characteristic of the conversion data is set, on the basis of the color reproduction range in the output form of the visible image, such that the change in saturation does not become saturated. Thus, in addition to the above-described effect, there is the effect that a deterioration in image quality such as oversaturation or the like in the visible image can reliably be prevented.

In the ninth aspect of the present invention, in the invention of the first aspect, a plurality of types of conversion data, whose saturation change amounts are respectively different, are stored, and the image data is converted by using the conversion data corresponding to the saturation change amount instructed via the instructing section. Thus, in addition to the above-described effect, there is the effect that a visible image which has been adjusted to a saturation desired by the operator can be easily obtained.

In the tenth aspect of the present invention, in the invention of the ninth aspect, conversion data corresponding to an instructed saturation change amount is determined by interpolation, on the basis of conversion data corresponding to a saturation change amount which approximates a saturation change amount instructed via the instructing section, by using, as the plural types of conversion data, different conversion data whose saturation change amounts are respectively greater than or equal to a predetermined value. Thus, in addition to the above-described effects, there is the effect that the storage capacity required for storing the conversion data can be reduced.

In the eleventh aspect of the present invention, in the invention of the first aspect, on the basis of respectively different color reproduction ranges in plural types of output forms of the visible image, plural types of conversion data, whose conversion characteristics are set such that the saturation changes do not become saturated, are respectively stored, and the image data is converted by using the conversion data corresponding to the output form which is being used. Thus, in addition to the above-described effect, there is the effect that a visible image whose saturation has been changed appropriately can be obtained regardless of the output form of the visible image.

In the twelfth aspect of the present invention, in the invention of the first aspect, when a color region for which a change in saturation is to be suppressed is designated via the designating section, conversion data of a conversion characteristic which suppresses a saturation change in the visible image is generated for the pixels belonging to at least one of the predetermined color region and the color region designated via the designating section. Thus, in addition to the above-described effect, there is the effect that the saturation of the image can be changed at a desired conversion characteristic.

In the thirteenth aspect of the present invention, in the invention of the first aspect, an image, which is expressed by image data which has been converted by the converting section, is displayed on a display section. Thus, in addition to the above-described effect, there is the effect that the operator can easily confirm whether the saturation has been changed accurately.

Further, as described above, in the present invention, the conversion characteristic of the conversion section is controlled such that the gradation of the image data is converted in accordance with a designated conversion characteristic. Further, the image data which has undergone conversion by the converting section is reconverted or the conversion characteristic of the converting section is controlled such that changes in the ratios of the differences of the respective color components with respect to the gray of each pixel of the image data, which changes accompany the gradation of the image data being converted in accordance with the designated conversion characteristic, are respectively corrected. Thus, an excellent effect is achieved in that changes in image quality, which changes accompany the conversion of the gradation, can be accurately corrected.

What is claimed is:

1. An image processing device including a storing section which stores conversion data of a conversion characteristic which changes, in units of respective pixels and by a predetermined amount, saturation, in a visible image, of image data used in output of the visible image; and a converting section which converts the image data used in output of the visible image in accordance with the conversion data stored in the storing section, wherein the conversion data stored in the storing section has a conversion characteristic which suppresses a change in saturation in the visible image for pixels belonging to a predetermined color region and in a vicinity of a border of the predetermined color region, the degree of suppression of change in saturation is greater the closer to a center of the predetermined color region than at the edge of the border.

2. An image processing device according to claim 1, wherein the predetermined color region is a region in which a hue angle in the visible image falls within a predetermined range.

3. An image processing device according to claim 2, wherein the predetermined range is a range corresponding to skin color.

4. An image processing device according to claim 1, wherein the predetermined color region includes at least one of a low saturation region where saturation in the visible image is low, and a high saturation region where saturation in the visible image is high.

5. An image processing device according to claim 1, wherein the predetermined color region includes at least one of a high lightness region where lightness in the visible image is high, and a low lightness region where lightness in the visible image is low.

6. An image processing device according to claim 1, wherein the conversion data is data which makes correspond a color value before a saturation change and a color value after the saturation change, when color values in the image data are changed such that saturation in the visible image changes.

7. An image processing device according to claim 1, wherein the conversion characteristic of the conversion data is set, on the basis of a color reproduction gamut in an output form of the visible image, such that a change in saturation is not saturated.

8. An image processing device according to claim 1, further comprising:

an instructing section for instructing a saturation change amount, wherein a plurality of types of conversion data having respectively different saturation change amounts are stored in the storing section, and the converting section converts image data by using, among the plurality of types of conversion data, conversion data which corresponds to a saturation change amount which is instructed via the instructing section.

9. An image processing device according to claim 8, wherein the saturation change amounts of the plurality of types of conversion data are respectively different by greater than or equal to a predetermined value, and in a case in which the saturation change amount instructed via the instructing section is a substantially intermediate value of saturation change amounts corresponding to any of the plurality of types of conversion data, the converting section, on the basis of conversion data corresponding to a saturation change amount which approximates the instructed saturation change amount, determines, by interpolation, conversion data corresponding to the instructed saturation change amount, and converts the image data by using the determined conversion data.

10. An image processing device according to claim 1, wherein a plurality of types of output forms having respectively different color reproduction gamut of the visible image are prepared as output forms of the visible image, and on the basis of the color reproduction ranges of the plurality of types of output forms, the storing section stores a plurality of types of conversion data whose conversion characteristics are set such that a change in saturation does not become saturated, and the converting section converts the image data by using conversion data corresponding to an output form which is used.

11. An image processing device according to claim 1, further comprising:

a designating section for designating a color region for which a change in saturation is to be suppressed; and a generating section for generating conversion data of a conversion characteristic which suppresses a change in saturation in the visible image, for pixels belonging to at least one of the predetermined color region and a color region designated via the designating section.

12. An image processing device according to claim 1, further comprising:

a display section for displaying an image; and a display control section for making the display section display an image expressed by image data which is converted by the converting section.

13. An image processing method in which conversion data of a conversion characteristic which changes, in units of respective pixels and by a predetermined amount, saturation, in a visible image, of image data used in output of the visible image, is stored, and the image data used in output of the visible image is converted in accordance with the stored conversion data, wherein the stored conversion data has a conversion characteristic which suppresses a change in saturation in the visible image for pixels belonging to a predetermined color region and in a vicinity of a border of the predetermined color region, the degree of suppression of change in saturation is greater the closer to a center of the predetermined color region than at the edge of the border.

* * * * *